(12) United States Patent
Necka et al.

(10) Patent No.: US 6,952,428 B1
(45) Date of Patent: Oct. 4, 2005

(54) SYSTEM AND METHOD FOR A SPECIALIZED DYNAMIC HOST CONFIGURATION PROTOCOL PROXY IN A DATA-OVER-CABLE NETWORK

(75) Inventors: William Necka, Bloomingdale, IL (US); Igor Fey, Buffalo Grove, IL (US); Ali Akgun, Chicago, IL (US); Yuri Arutyunov, Schaumburg, IL (US)

(73) Assignee: 3Com Corporation, Marlborough, MA (US)

( * ) Notice: Subject to any disclaimer, the term of this patent is extended or adjusted under 35 U.S.C. 154(b) by 833 days.

(21) Appl. No.: 09/772,095

(22) Filed: Jan. 26, 2001

(51) Int. Cl.$^7$ .................................................. H04J 3/16
(52) U.S. Cl. ........................ 370/466; 370/352; 709/220
(58) Field of Search ................................ 370/401, 352, 370/475, 474, 351, 353, 354, 355, 466; 709/229, 238–242, 245, 220, 227, 218; 725/9, 110–117

(56) References Cited

U.S. PATENT DOCUMENTS

| 4,644,533 A | 2/1987 | Braff et al. ..................... 370/94 |
| 4,881,263 A | 11/1989 | Herbison et al. ............. 380/21 |

(Continued)

FOREIGN PATENT DOCUMENTS

WO    WO 9826530 A1  *  6/1998  .............. H04J/3/02

OTHER PUBLICATIONS

"Cable Modem to Customer Premise Equipment Interface Specification (Interim) SP–CMCI–I02–980317", Multimedia Cable Network Systems (MCNS) Holdings, L.P., Cable Television Laboratories, Inc., 1998, pp. ii to 40.

(Continued)

Primary Examiner—Bob Phunkulh
Assistant Examiner—Ian N. Moore
(74) Attorney, Agent, or Firm—McDonnell Boehnen Hulbert & Berghoff LLP

(57) ABSTRACT

A system and method for proxying Dynamic Host Configuration Protocol ("DHCP") network services for a network device, such as, a customer premise equipment entity, on a network device, such as, a cable modem, include creating a specialized proxy task for the customer premise equipment entity on the cable modem. One method of the present invention includes intercepting DHCP message flow between a customer premise equipment having a specialized proxy task created on the cable modem and a DHCP server selected by the customer premise equipment entity. The methods further include modifying lease time intervals prior to providing a routable network address lease to a customer premise equipment entity and renewing an initial lease for the customer premise equipment entity by a cable modem prior to expiration of the lease time interval provided by a DHCP server. The methods include using known protocols, such as, for example, the Dynamic Host Configuration Protocol.

22 Claims, 12 Drawing Sheets

U.S. PATENT DOCUMENTS

| | | | |
|---|---|---|---|
| 4,996,685 A | 2/1991 | Farese et al. | 370/58.1 |
| 5,014,234 A | 5/1991 | Edwards, Jr. | 364/900 |
| 5,138,712 A | 8/1992 | Corbin | 395/700 |
| 5,301,273 A | 4/1994 | Konishi | 395/200 |
| 5,347,304 A | 9/1994 | Moura et al. | 348/12 |
| 5,430,727 A | 7/1995 | Callon | 370/85.13 |
| 5,442,749 A | 8/1995 | Northcutt et al. | 395/200.09 |
| 5,488,412 A | 1/1996 | Majeti et al. | 348/10 |
| 5,489,897 A | 2/1996 | Inoue | 340/870.39 |
| 5,557,748 A * | 9/1996 | Norris | 709/220 |
| 5,583,931 A | 12/1996 | Schneider et al. | 379/399 |
| 5,586,121 A | 12/1996 | Moura et al. | 370/404 |
| 5,598,410 A | 1/1997 | Stone | 370/469 |
| 5,600,717 A | 2/1997 | Schneider et al. | 379/399 |
| 5,606,606 A | 2/1997 | Schneider et al. | 379/399 |
| 5,608,446 A | 3/1997 | Carr et al. | 348/6 |
| 5,610,910 A | 3/1997 | Focsaneanu et al. | 370/351 |
| 5,623,542 A | 4/1997 | Schneider et al. | 379/399 |
| 5,623,601 A | 4/1997 | Vu | 395/187.01 |
| 5,636,211 A | 6/1997 | Newlin | 370/465 |
| 5,675,732 A | 10/1997 | Majeti et al. | 395/200.01 |
| 5,675,742 A | 10/1997 | Jain et al. | 395/200 |
| 5,710,885 A | 1/1998 | Bondi | 395/200.54 |
| 5,724,510 A | 3/1998 | Arndt et al. | 395/200.5 |
| 5,761,602 A | 6/1998 | Wagner et al. | 455/3.1 |
| 5,778,181 A | 7/1998 | Hidary et al. | 395/200.48 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | 395/200.61 |
| 5,790,806 A | 8/1998 | Koperda | 395/200.82 |
| 5,793,747 A | 8/1998 | Kline | 370/230 |
| 5,799,086 A | 8/1998 | Sudia | 380/23 |
| 5,805,804 A | 9/1998 | Laursen et al. | 395/200.02 |
| 5,809,252 A | 9/1998 | Beighe et al. | 395/200.57 |
| 5,812,819 A | 9/1998 | Rodwin et al. | 395/500 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 395/200.52 |
| 5,828,655 A | 10/1998 | Moura et al. | 370/236 |
| 5,828,666 A | 10/1998 | Focsaneanu et al. | 370/389 |
| 5,835,720 A | 11/1998 | Nelson et al. | 395/200.54 |
| 5,835,727 A | 11/1998 | Wong et al. | 395/200.68 |
| 5,841,777 A | 11/1998 | Cohen | 370/433 |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,884,024 A * | 3/1999 | Lim et al. | 713/201 |
| 5,903,558 A | 5/1999 | Jones et al. | 370/351 |
| 5,909,549 A | 6/1999 | Compliment et al. | 709/223 |
| 5,913,037 A | 6/1999 | Spofford et al. | 395/200.56 |
| 5,915,119 A | 6/1999 | Cone | 395/750.02 |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,943,604 A | 8/1999 | Chen et al. | 455/5.1 |
| 5,954,797 A | 9/1999 | Sidey | 709/223 |
| 5,958,007 A | 9/1999 | Lee et al. | 709/219 |
| 5,974,453 A | 10/1999 | Anderson et al. | 709/220 |
| 5,982,748 A | 11/1999 | Yin et al. | 370/232 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | 713/201 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A * | 12/1999 | Woundy | 370/401 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 455/3.1 |
| 6,018,767 A * | 1/2000 | Fijolek et al. | 709/218 |
| 6,031,841 A | 2/2000 | Woundy | 370/410 |
| 6,041,041 A | 3/2000 | Ramanathan et al. | 370/241 |
| 6,049,546 A | 4/2000 | Ramakrishnan | 370/412 |
| 6,049,825 A | 4/2000 | Yamamoto | 709/221 |
| 6,049,826 A | 4/2000 | Beser | 709/222 |
| 6,052,724 A | 4/2000 | Willie et al. | 709/223 |
| 6,058,421 A | 5/2000 | Fijolek et al. | 709/225 |
| 6,065,049 A | 5/2000 | Beser | 709/218 |
| 6,070,242 A | 5/2000 | Wong et al. | 713/201 |
| 6,070,246 A | 5/2000 | Beser | 713/201 |
| 6,073,178 A * | 6/2000 | Wong et al. | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Naskey et al. | 714/4 |
| 6,157,965 A | 12/2000 | Mohammed et al. | 710/8 |
| 6,170,061 B1 | 1/2001 | Beser | 713/201 |
| 6,185,624 B1 | 2/2001 | Fijolek et al. | 709/239 |
| 6,189,102 B1 | 2/2001 | Beser | 713/201 |
| 6,212,563 B1 | 4/2001 | Beser | 709/227 |
| 6,223,222 B1 | 4/2001 | Fijolek et al. | 709/227 |
| 6,226,272 B1 * | 5/2001 | Okano et al. | 370/259 |
| 6,240,464 B1 | 5/2001 | Fijolek et al. | 709/250 |
| 6,260,072 B1 | 7/2001 | Rodriguez-Moral | 709/241 |
| 6,269,099 B1 | 7/2001 | Borella et al. | 370/389 |
| 6,275,853 B1 | 8/2001 | Beser et al. | 709/223 |
| 6,295,554 B1 | 9/2001 | Karadogan et al. | 709/219 |
| 6,393,484 B1 * | 5/2002 | Massarani | 709/227 |
| 6,452,925 B1 * | 9/2002 | Sistanizadeh et al. | 370/352 |
| 6,466,986 B1 * | 10/2002 | Sawyer et al. | 709/245 |
| 6,578,074 B1 * | 6/2003 | Bahlmann | 709/220 |
| 6,603,758 B1 * | 8/2003 | Schmuelling et al. | 370/352 |
| 6,618,353 B2 * | 9/2003 | Merrill et al. | 370/225 |
| 6,697,360 B1 * | 2/2004 | Gai et al. | 370/389 |
| 2002/0023174 A1 * | 2/2002 | Garrett et al. | 709/245 |
| 2002/0036658 A1 * | 3/2002 | Carolan et al. | 345/764 |
| 2003/0093505 A1 * | 5/2003 | Waldo et al. | 709/220 |

OTHER PUBLICATIONS

"Operations Support System Interface Specification Baseline Privacy Interface MIB (Interim Specification) SP-OS-SI-BPI-I01-980331", MCNS Holdings, L.P., 1997 and 1998, pp. ii to 33.

"Cable Modem Termination System-Network Side Interface Specification (Interim Specification) SP-CMTS-N-SII01-960702", MCNS Holdings, L.P., 1996, pp. ii to 13.

"Removable Security Module Interface Specification (Interim Specification) SP-RSMI-I01-980204", MCNS Holdings L.P., Cable Television Laboratories, Inc., 1997, pp. ii to 47.

"Baseline Privacy Interface Specification (Interim) SP-B-PI-I01-970922", MCNS Holdings, L.P., 1997, pp. ii to 65.

"Operations Support System Interface Specification (Interim) SP-OSSII01-970403", MCNS Holdings, L.P., 1997, pp. 1 to 30.

"Radio Frequency Interface Specification (Interim Specification) SP–RFI–I02–971008", MCNS Holdings, L.P., 1997, pp. ii to 186.

"Cable Modem Telephony Return Interface Specification (Interim) SP–CMTRI–I01–970804", MCNS Holdings, L.P., Cable Television Laboratories, Inc., 1997, pp. ii to 73.

"Security System Specification (Interim Specification) SP–SSI–I01–970506", MCNS Holdings, L.P., 1997, pp. ii to 103.

"Internet Engineering Task Force", Request for Comments 2131, Dynamic Host Configuration Protocol (DHCP), Mar. 1997, pp. 1 to 42.

S. Adiraju, J. Fijolek, IPCDN Telephony Return MIB, Internet Engineering Task Force, Internet Draft, "<draft–ietf–ipcdn–tri–mib–00.1.txt>," Mar. 1998, pp. 1 to 26.

Kyees, P.J. et al., *ADSL: A New Twisted–Pair Access to the Information Highway,* IEEE Communications Magazine, vol. 33, Issue 4, Apr. 1995, pp. 52–60.

Huang, Yin–Hwa et al., *Design of an MPEG–Based Set–Top Box for Video on Demand Services,* Acoustics, Speech, and Signal Processing, 1995, ICASSP–95., 1995 International Conference, vol. 4, ISBN: 0–7803–2431–5, May 9–12, 1995, pp. 2655–2658.

"A Solution for the Priority Queue Problem of Deadline–Ordered Service Disciplines," N.R. Figueira, IEEE International Conference on Computer Communications and Networks, Sep. 22–25, 1997, pp. 320–325.

"Radio Frequency Interface Specification (Interim Specification) SP–RFI–105–991105", MCNS Holdings, L.P., 1999, pp. ii to 202.

"Radio Frequency Interface Specification (Interim Specification) SP–RFIv1.1–106–001215", MCNS Holdings, L.P., 2000, pp. ii to 432.

* cited by examiner

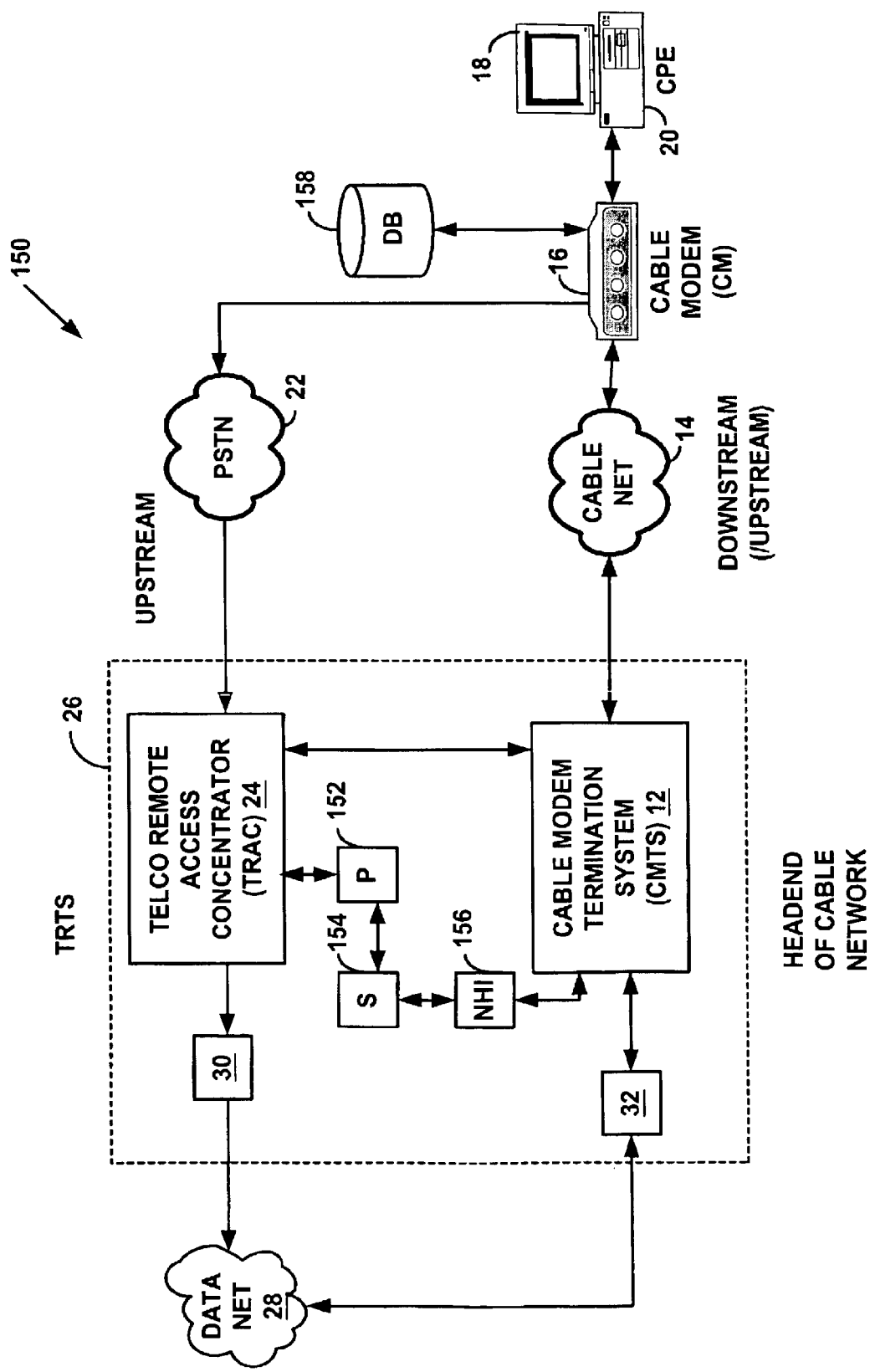

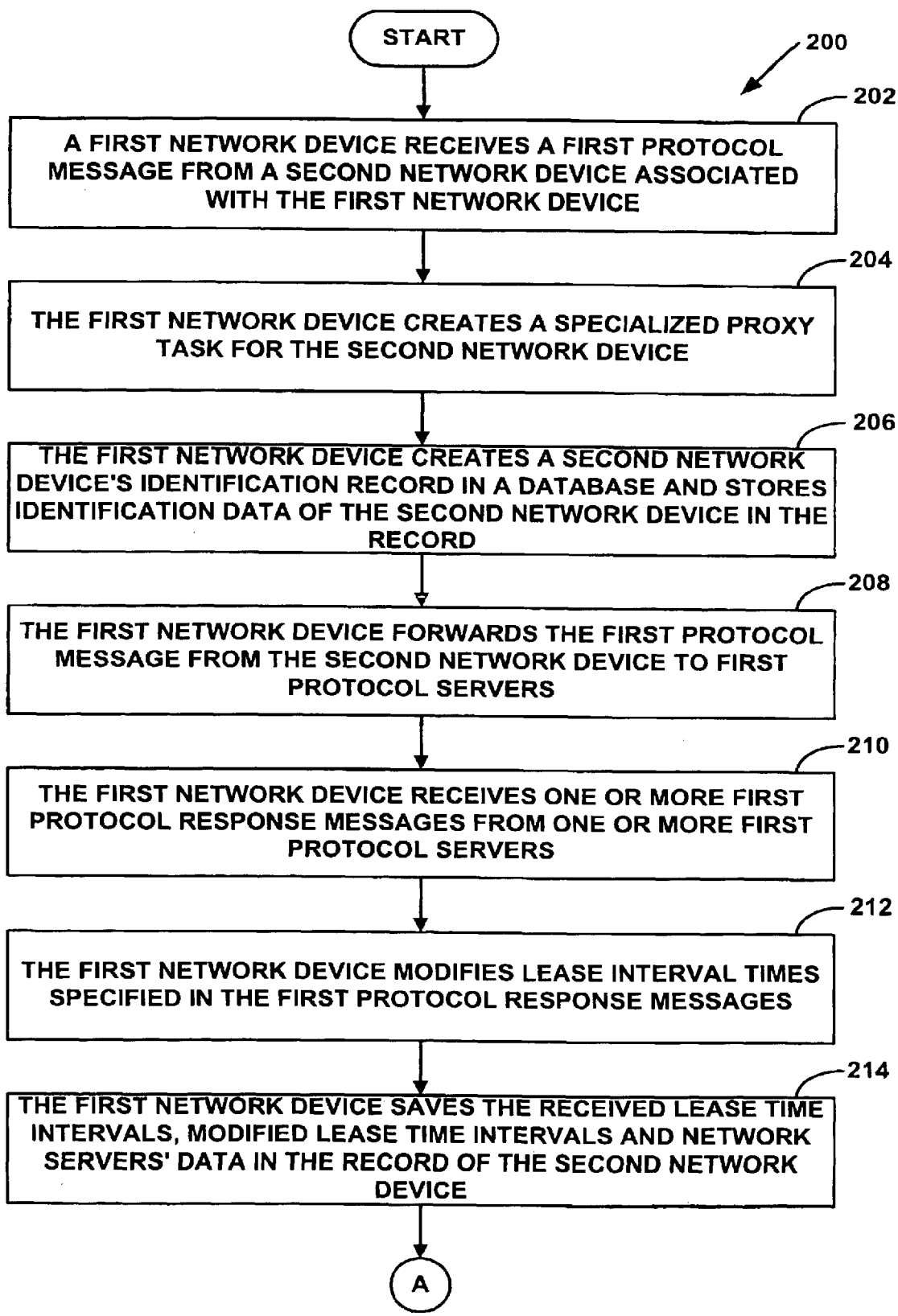

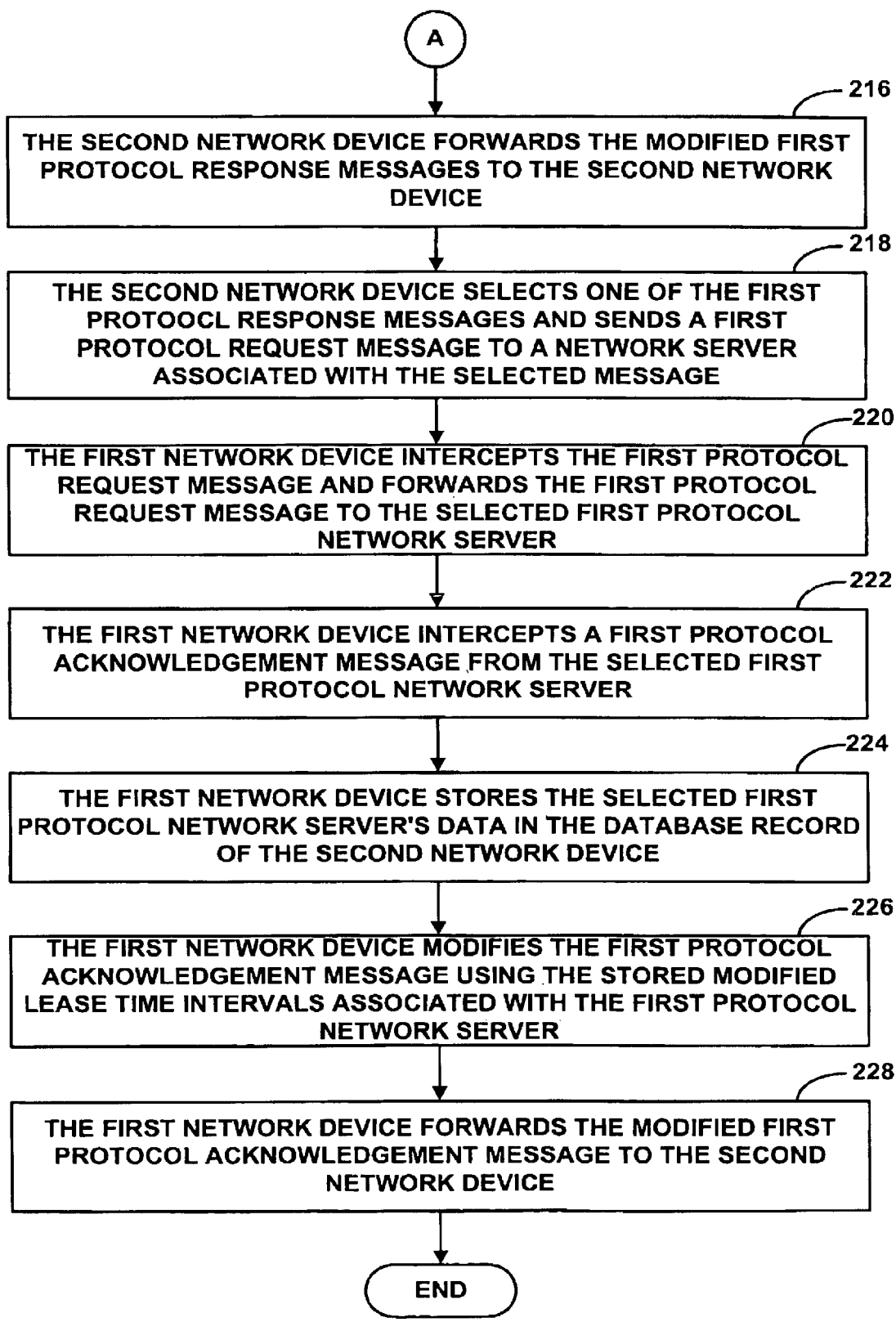

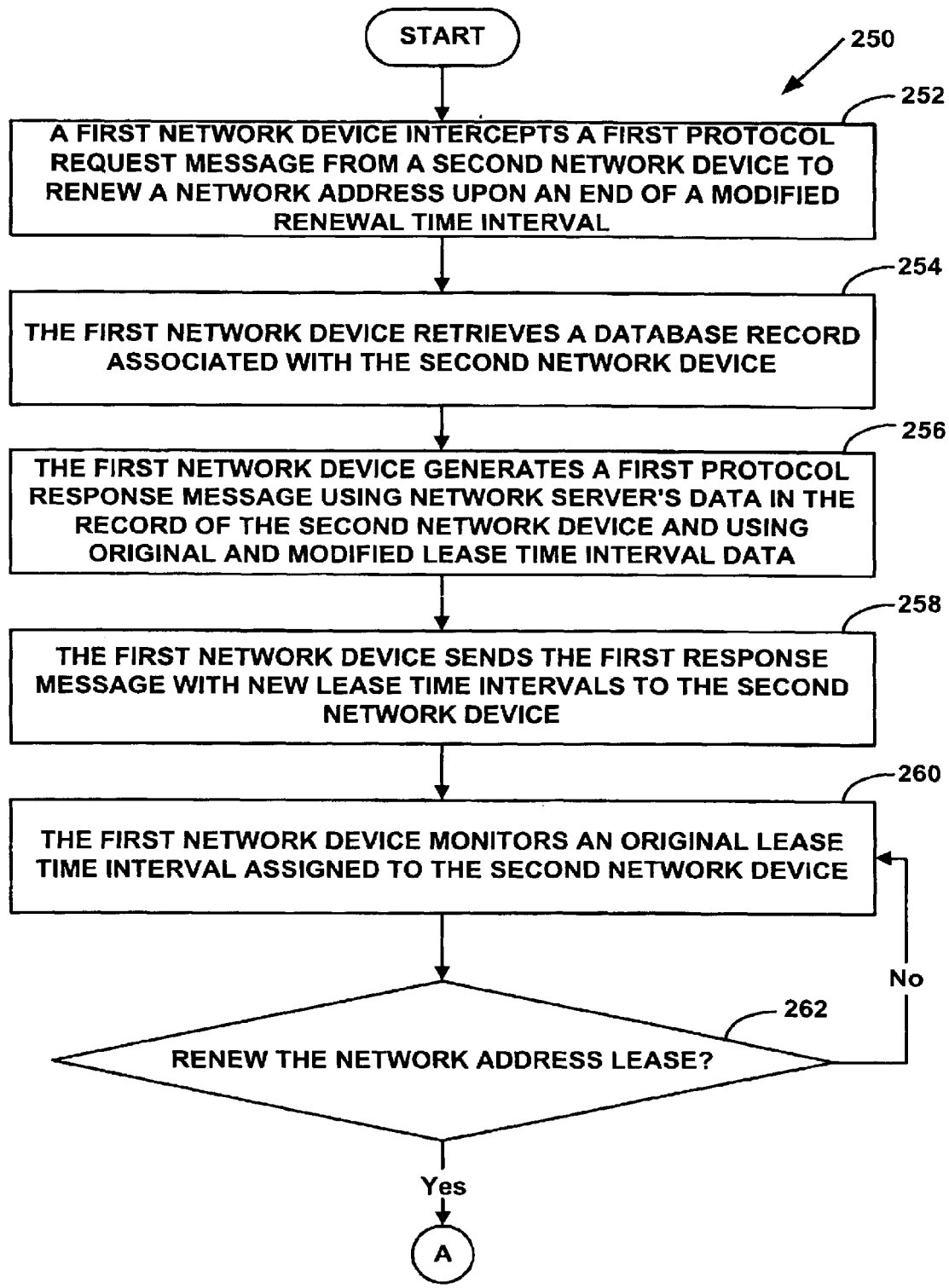

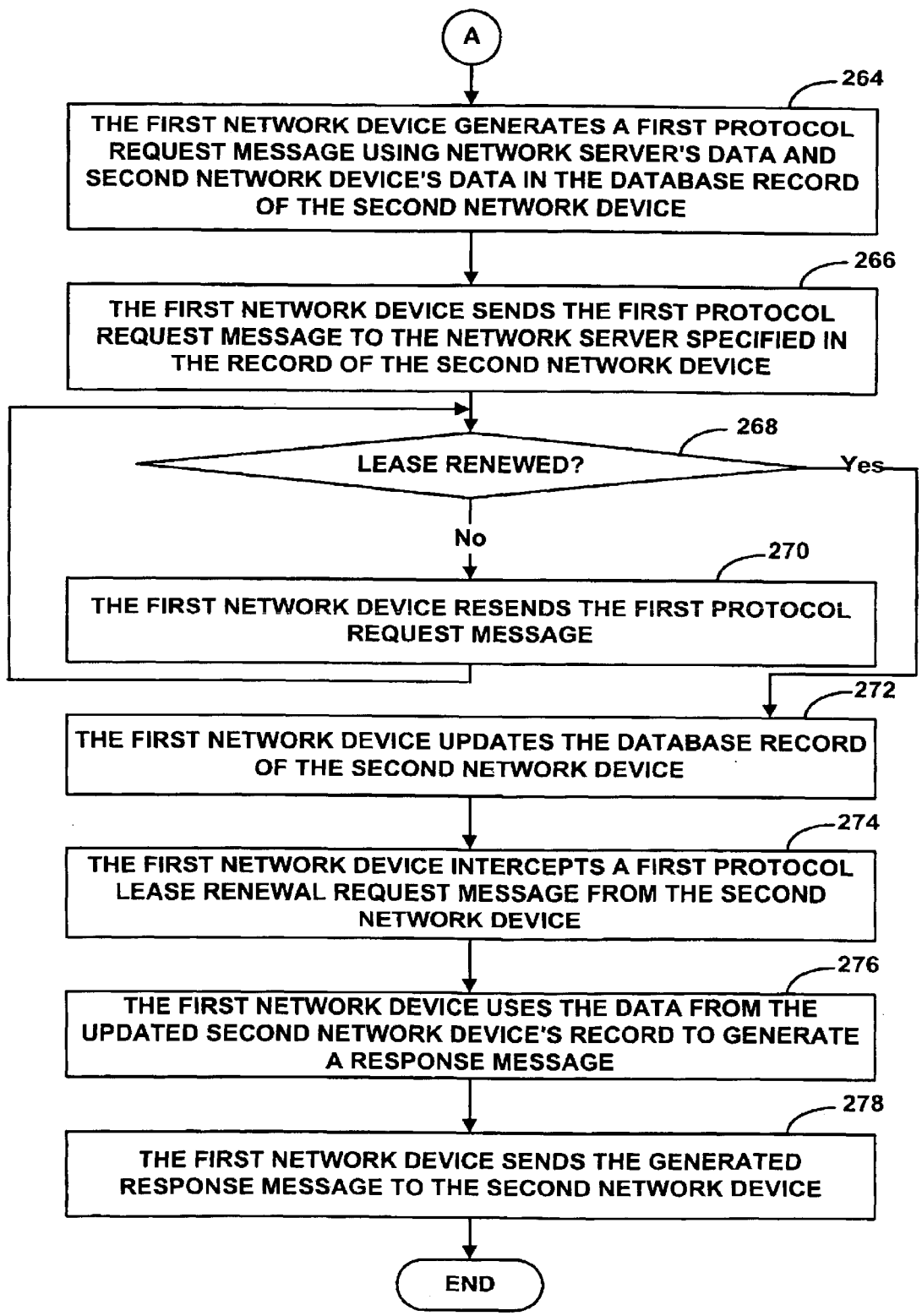

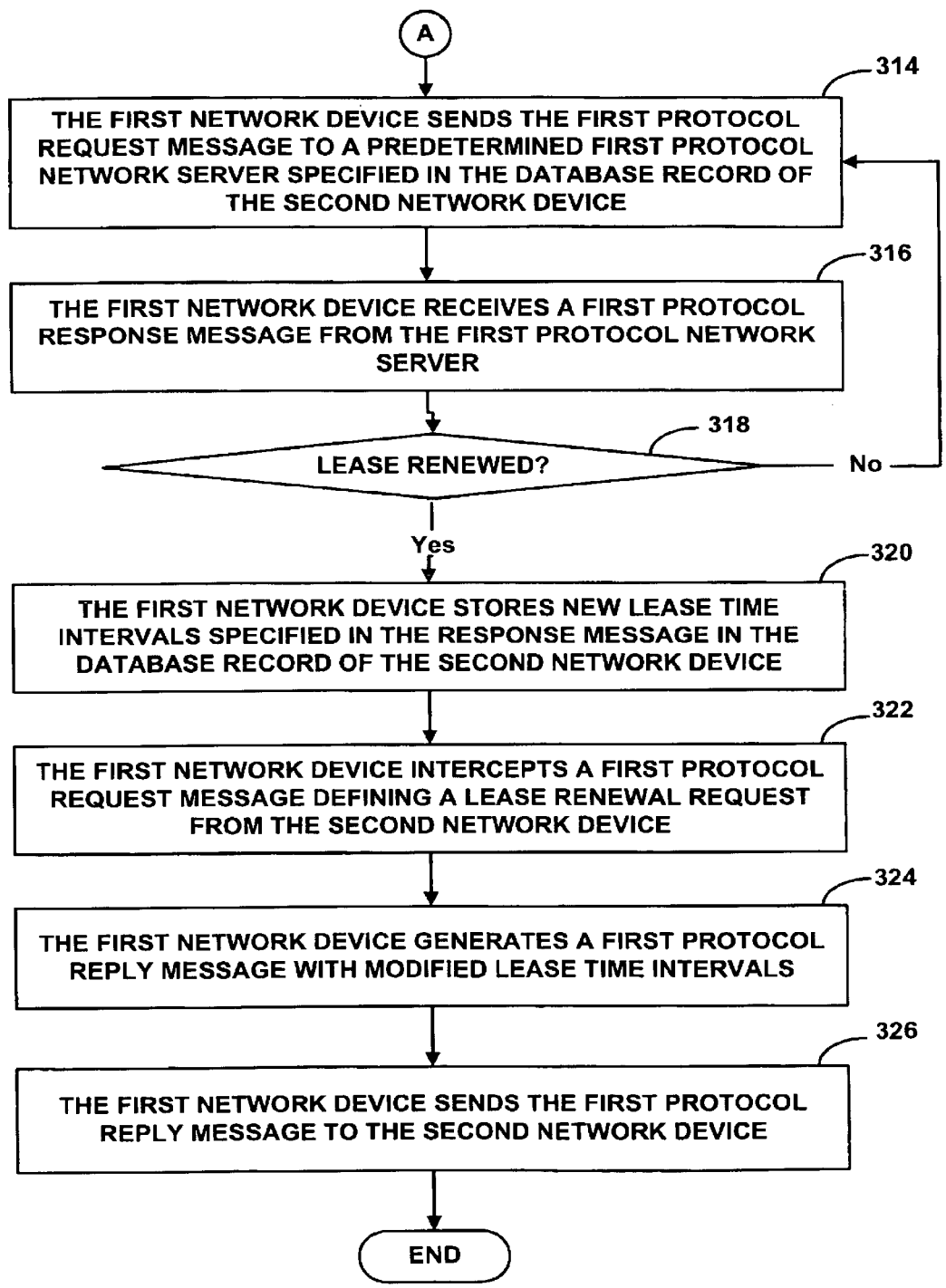

SYSTEM AND METHOD FOR A SPECIALIZED DYNAMIC HOST CONFIGURATION PROTOCOL PROXY IN A DATA-OVER-CABLE NETWORK

FIELD OF THE INVENTION

The present invention relates to communications in computer networks. More particularly, it relates to a system and method for Dynamic Host Configuration Protocol proxy in a data-over-cable network.

BACKGROUND OF THE INVENTION

Cable television networks such as those provided by Comcast Cable Communications, Inc., of Philadelphia, Pa., Cox Communications of Atlanta Ga., Time-Warner Cable, of Marietta Ga., Continental Cablevision, Inc., of Boston Mass., and others, provide cable television services to a large number of subscribers over a large geographical area.

The cable television networks typically are interconnected by cables such as coaxial cables or a Hybrid Fiber/Coaxial ("HFC") cable system which have data rates of about 10 Mega-bits-per-second ("Mbps") to 30+ Mbps.

The Internet, a world-wide-network of interconnected computers, provides multi-media content including audio, video, graphics and text that requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to 30+ Mbps available on a coaxial cable or HFC cable system on a cable television network.

With the explosive growth of the Internet, many customers have desired to use the larger bandwidth of a cable television network to connect to the Internet and other computer networks. Cable modems, such as those provided by 3Com Corporation of Santa Clara, Calif., Motorola Corporation of Arlington Heights, Ill., Cisco Corporation of San Jose, Calif., Scientific-Atlanta, of Norcross, Ga., and others, offer customers higher-speed connectivity to the Internet, an intranet, Local Area Networks ("LANs") and other computer networks via cable television networks. These cable modems currently support a data connection to the Internet and other computer networks via a cable television network with a data rate of up to 30+ Mbps, which is a much larger data rate than can be supported by a modem used over a serial telephone line.

Many cable television networks provide bi-directional cable systems, in which data is sent "downstream", from a "headend" to a customer, as well as "upstream", from the customer back to the headend. The cable system headend is a central location in the cable television network and, further, is responsible for sending cable signals in the downstream direction and receiving cable signals in the upstream direction. An exemplary data-over-cable system with RF return typically includes customer premises equipment entities such a customer computer, a cable modem, a cable modem termination system, a cable television network, and a data network such as the Internet.

Some cable television networks provide only uni-directional cable systems, supporting only a "downstream" data path, which provides a path for flow of data from a cable system headend to a customer. A return data path via a telephone network, such as a public switched telephone network provided by AT&T and others, (i.e., a "telephone return") is typically used for an "upstream" data path, which provides a path for flow of data from the customer back to the cable system headend. A cable television system with an upstream connection to a telephone network is typically called a "data-over-cable system with telephony return."

An exemplary data-over-cable system with a telephony return typically includes customer premise equipment ("CPE") entities (such as a customer computer or a Voice over Internet Protocol ("VoIP") device), a cable modem, a cable modem termination system, a cable television network, a public switched telephone network, a telephone remote access concentrator, and a data network (e.g., the Internet). The cable modem termination system and the telephone remote access concentrator combined are called a telephone return termination system.

If the customer premises equipment entity comprises a telephone or a device capable of sending and receiving video or voice signals, the cable modem has to be capable of sending and receiving such signals. In such cases, the cable modem typically comprises an internal media terminal adapter, which provides a network interface functionality that accepts analog voice inputs or video signal and generates IP packets using the Real Time Transport Protocol, for instance.

In a bi-directional cable system, when a cable modem termination system receives data packets from a data network, the cable modem termination system transmits received data packets downstream via the cable television network to a cable modem attached to a customer premises equipment entity. The customer premises equipment entity sends response data packets to the cable modem, which sends the response data packets upstream via the cable network. The cable modem termination system sends the response data packets back to the appropriate host on the data network.

In the case of a telephony return system, when a cable modem termination system receives data packets from a data network, the cable modem termination system transmits the received data packets downstream via a cable television network to a cable modem attached to a customer premises equipment entity. The customer premises equipment entity sends response data packets to the cable modem, which sends response data packets upstream via a public switched telephone network to a telephone remote access concentrator. Next, the telephone remote access concentrator sends the response data packets back to the appropriate host on the data network. When a cable modem used in a cable system is initialized, the cable modem establishes a communication link to a cable modem termination system via a cable network and, in telephony return data-over-cable systems, to a telephone return termination system via a public switched telephone network. As the cable modem is initialized, the cable modem initializes one or more downstream channels via the cable network. Also upon initialization, the cable modem receives a configuration file (a boot file) from a configuration server via a trivial file-transfer protocol ("TFTP") exchange process.

The configuration file may include a plurality of configuration parameters encoded in a type-length-value format ("TLV"), for instance. The configuration file may comprise a plurality of Class-of-Service ("CoS") and Quality-of-Service ("QoS") parameters. The Class of Service parameters include, for example, maximum allowed data rates, minimum reserved data rate, maximum latency and a plurality of other parameters. The Quality of Service parameters include, for example, parameters defining delays expected to deliver data to a specific destination, a level of protection from unauthorized monitoring or modification of data, an expected residual error probability, a relative priority associated with data and a plurality of other parameters.

Upon a receipt of a configuration file, a cable modem may register with a cable modem termination system. To do that, the cable modem may send to the cable modem termination system a registration request message comprising a copy of the configuration file including a plurality of QoS and CoS parameters.

Similarly to a cable modem, a customer premise equipment entity obtains network access parameters such as an IP address of a network interface via which the customer premise equipment entity may send and receive data from a data network. Typically, a customer premise equipment entity receives an IP address from a network server such as a Dynamic Host Configuration Protocol server. Further, as is known in the art, when a network server provides an IP address for a customer premise equipment entity, the server typically leases that address for a predetermined period of time, and the customer premise equipment entity has to renew the lease prior to the lease's expiration. It is often desirable that a customer premise equipment entity receives the same IP address upon the lease renewal. However, when an original lease of a customer premise equipment entity expires during the time when the customer premise equipment entity is turned off, there is a very low probability that the customer premise entity receives the same IP address upon sending a lease renewal request to a designated network server.

Further, during a mass re-registration following a headend system failure, the network activity on network servers providing network services to customer premise equipment entities often exceeds acceptable loads, and many customer premise equipment entities may not be able to renew their leases for a longer time. Additionally, when many customer premise equipment entities try to acquire network services at the same time, the upstream bandwidth usage may exceed acceptable limits.

Further, as is known in the art, there are two types of IP addresses that are assigned to network devices. A public access IP address is typically used to reach network devices such as mail servers located on other networks, and may not be used to access public networks. Typically, cable modems are assigned private access IP addresses and may not access network devices on public networks. However, in some applications, it would be desirable to provide a cable modem with an ability to access network devices or servers on public networks. Further, it is desirable to develop a system and method that would allow for longer retention of IP address leases at a customer premise equipment entity and reduction of a traffic load on a network server providing services to many customer premise equipment entities.

SUMMARY OF THE INVENTION

According to an exemplary embodiment, methods and system for a specialized DHCP proxy on a network device are developed.

In one embodiment, when a second network device in communication with a first network device initiates a process of obtaining a routable network address and selects a first protocol network server, the first network device creates a database record for the second network device. The database record of the second network device includes identification data associated with the second network device and identification data associated with the selected first protocol network server. According to an exemplary embodiment, the first network device intercepts first protocol message flow between the first protocol network server and the second network device. Thus, when the first protocol network server sends a first protocol offer message defining a routable network address and a network address lease time interval for the second network device, the first network device intercepts the first message prior to the second network device receiving the first protocol offer message. In one embodiment, when the first network device intercepts the first protocol offer message, the first network device modifies the lease time interval specified in the first protocol offer message. In one embodiment, the first network device modifies the lease time interval to a shorter lease time interval. Then, the first network device stores the modified and original lease time interval values in the database record of the second network device. Next, the first network device sends the modified first protocol offer message to the second network device.

Further, according to an exemplary embodiment, when the second network device generates a first protocol lease renewal request message upon an expiration time of the modified lease time interval, the first network device intercepts the first protocol request message prior to the first protocol network server receiving the message. Next, the first network device generates a first protocol response message using the identification data of the first protocol network server, as well as, the original lease time interval and the modified time interval values stored in the database record. According to an exemplary embodiment, the first network device uses the original lease time interval and the modified lease time interval values to determine a remaining lease time interval. In one embodiment, the first network device may specify the remaining lease time interval in the first protocol response message. Alternatively, the first network device could specify a portion of the remaining lease time interval in the first protocol response message. Next, the first network device sends the first protocol response message to the second network device.

Further, according to an exemplary embodiment, the first network device monitors the expiration time of the lease time interval provided by the first protocol network server and stored in the database record of the second network device. In one embodiment, the first network device generates a first protocol request message to renew the lease of the routable network address associated with the second network device. To do that, the first network device uses the identification data of the second network device and the identification data of the first protocol network server associated with the second network device. Then, the first network device sends the first protocol request message to the first protocol network server prior to the expiration time of the original lease time interval.

According to an exemplary embodiment, the first network device is a cable modem, the second network device is a customer premises equipment entity, and the first protocol network server is a Dynamic Host Configuration Protocol network server. Further, the first protocol messages are Dynamic Host Configuration Protocol messages.

These as well as other aspects and advantages of the present invention will become more apparent to those of ordinary skill in the art by reading the following detailed description, with reference to the accompanying drawings.

BRIEF DESCRIPTION OF THE DRAWINGS

Exemplary embodiments of the present invention are described with reference to the following drawings, in which:

FIG. 5 is a block diagram illustrating a data-over-cable system in which exemplary embodiments may be applied;

FIGS. 6A and 6B are a flow chart illustrating a method for obtaining network addresses for customer premise equipment entities;

FIGS. 7A and 7B are a flow chart illustrating a method for a network address lease renewal for a customer premise equipment entity according to an exemplary embodiment;

FIGS. 8A and 8B are a flow chart illustrating a method for monitoring an activity state of a customer premise equipment entity and renewing a network address lease according to an exemplary embodiment.

DETAILED DESCRIPTION OF AN EXEMPLARY EMBODIMENT

Exemplary Data-over-cable System

Figure 1:
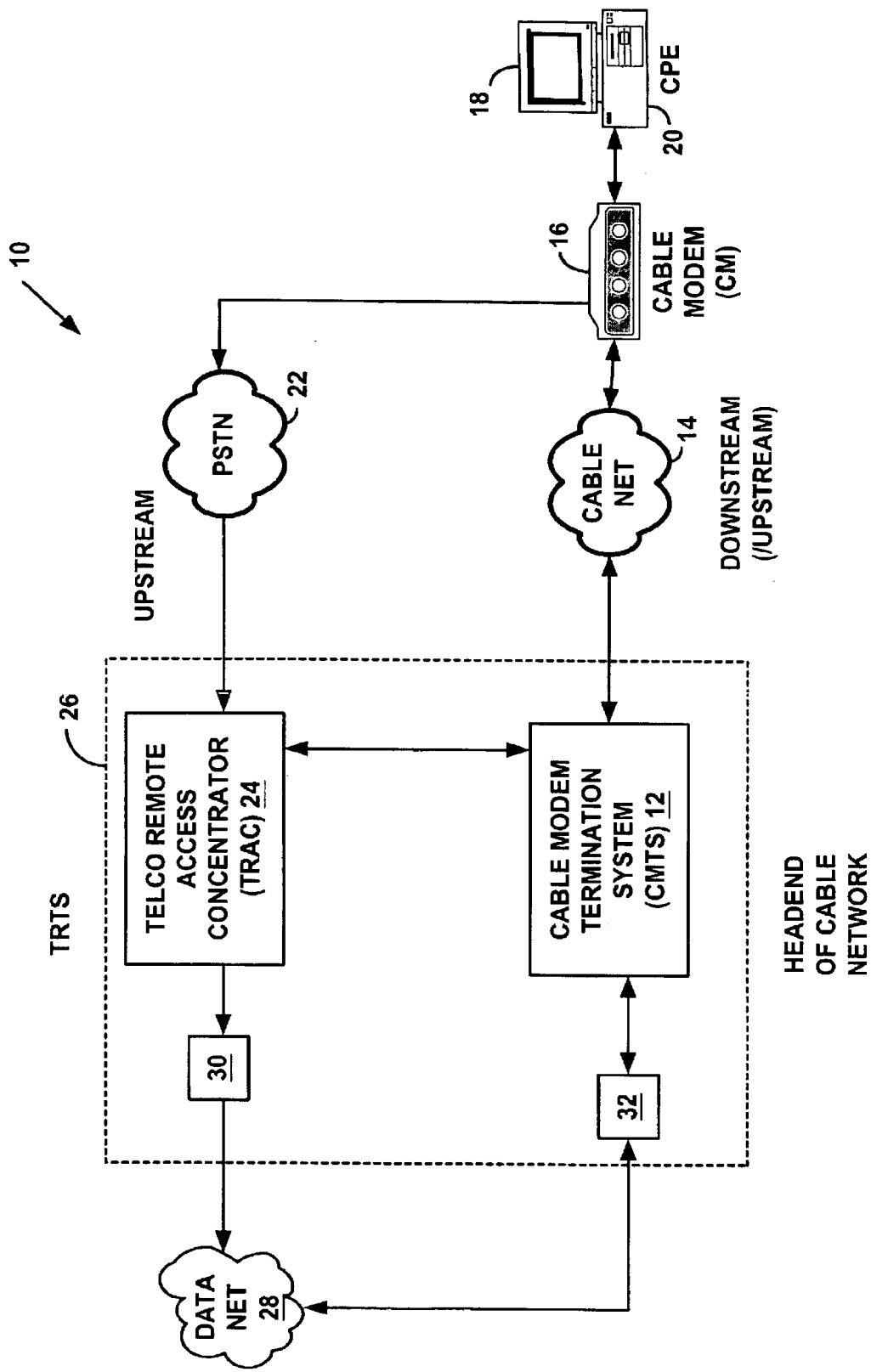
FIG. 1 is a block diagram illustrating a cable modem system.

FIG. 1 is a block diagram illustrating an exemplary data-over-cable system 10. The data-over-cable system 10 may be a bi-directional cable system supporting a downstream data flow and an upstream data flow to and from a cable television network "headend" from and to a customer premises equipment entity such as a personal computer, for instance. The cable television network "headend" is a central location responsible for sending cable signals in a downstream direction and an upstream direction. In a bi-directional cable system, customer premises equipment entities or a cable modem may have an upstream connection to a cable modem termination system via a cable television connection, a wireless connection, a satellite connection or a different connection by which the cable modem may send data upstream to the cable modem termination system.

Alternatively, the data-over-cable system 10 may be a unidirectional cable system supporting only a downstream data path from a cable television network headend to a customer premises equipment entity, such as a personal computer. In the uni-directional cable system, a return path is typically established via a telephone network ("telephone return"), which provides an "upstream" data path from the customer premises equipment back to the cable television network "headend". In a uni-directional cable system, a cable modem may comprise an integral telephone modem for connecting to a Public Switched Telephone Network ("PSTN") such as a PSTN 22, and the integral telephone modem may be connected to the cable modem for exchanging data.

The data-over-cable system 10 includes a Cable Modem Termination System ("CMTS") 12 connected to a cable television network 14, hereinafter, a cable network 14. FIG. 1 illustrates one CMTS 12. However, the data-over-cable system 10 may include multiple CMTS 12. Further, according to an exemplary embodiment, the CMTS 12 and any other network entities that will be described in the following paragraphs may be duplicated in a serial or a parallel arrangement to provide a back-up system in case of a primary network device's failure.

In the exemplary embodiment of the present invention, the CMTS 12 may be a Total Control hub by 3Com Corporation of Santa Clara, Calif., with a cable modem termination unit. A Total Control hub is a chassis with multiple networking cards connected by a common bus. However, the CMTS 12 could also be another network server such as a CMTS by Cisco Systems of San Jose, Calif., for instance.

The cable network 14 may be a cable television network such as one provided by Comcast Cable Communications, Inc., of Philadelphia, Pa., Cox Communications of Atlanta, Ga., or Time-Warner Cable, of Marietta, Ga., for instance.

A cable modem ("CM") 16 is connected to the cable network 14 with a downstream cable connection. The cable modem may be provided by 3Com Corporation of Santa Clara, Calif., or Motorola Corporation of Arlington Heights, Ill., for instance.

Network devices for exemplary embodiments of the present invention include network devices that can interact based on standards proposed by the Data-Over-Cable-Service-Interface-Specification ("DOCSIS") standards from the Multimedia Cable Network Systems ("MCNS"), the Institute of Electrical and Electronic Engineers ("IEEE"), International Telecommunications Union-Telecommunication Standardization Sector ("ITU"), Internet Engineering Task Force ("IETF"), and/or Wireless Application Protocol ("WAP") Forum. However, network devices based on other standards could also be used. DOCSIS standards can be found on the World Wide Web at the Universal Resource Locator ("URL") "www.cablemodem.com." IEEE standards can be found at the URL "www.ieee.org." The ITU, (formerly known as the CCITT) standards can be found at the URL "www.itu.ch." IETF standards can be found at the URL "www.ietf.org." The WAP standards can be found at the URL "www.wapforum.org." However, the present invention is not limited to these standards, and any other presently existing or later developed standards could also be used.

Further, the data-over-cable system 10 may be Packet Cable specifications compliant. The Packet Cable standards may be found on the World Wide Web at the URL "www.packetcable.com." The Packet Cable specifications define mechanisms required for supporting voice and video transmission over cable systems. If the data-over-cable system 10 is Packet Cable specification compliant, the CM 16 may comprise an internal media terminal adapter, or a media terminal adapter may otherwise be provided in communications with the CM 16. The media terminal adapter may provide a network interface functionality for transmitting voice or video signals and for converting analog voice inputs or video signals to IP packets using, for instance, the Real Time Transport protocol.

Furthermore, if the data-over-cable system 10 is Packet Cable Specification compliant, the data-over-cable system 10 may include a plurality of additional network devices such as a call management server and a gate controller, for instance. The call management server may enable the media terminal adapter to establish multimedia sessions including voice communications applications such as "IP telephony" or "VoIP". The gate controller may be used to perform authorization and authentication checks for users attempting to connect to the CMTS 12.

FIG. 1 illustrates one CM 16 connected to the CMTS 12. However, typical data-over-cable systems include tens or hundreds of thousands of CMs 16 connected to the CMTS 12. In addition, as shown in FIG. 1, the CM 16 is connected to a CPE entity 18 such as a personal computer system, a VoIP device or a telephone, for instance. The CM 16 may be connected to the CPE entity 18 via a Cable Modem-to-CPE Interface ("CMCI") 20. FIG. 1 illustrates one CPE entity 18. However the CM 16 is typically coupled to multiple CPE entities.

If the data-over-cable system 10 is a bi-directional data-over-cable system, the CM 16 may have an upstream and downstream connection to the CMTS 12 via a cable television connection, a wireless connection or a satellite connection, for instance. FIG. 1 illustrates an exemplary upstream and downstream connection to the CMTS 12 via the cable network 14. In such an embodiment, the CMTS 12 may still provide data from the PSTN 22 to the CM 16 or the CPE entity 18.

In a downstream direction of a bi-directional data-over-cable system, a cable system typically has a passband with a lower edge between 50 MHz and 54 MHz and an upper edge between 300 MHz to 864 MHz. However, the data-over-cable system 10 is not limited to such frequencies, and frequencies in data-over-cable system may be implementation dependent. In the upstream direction, the cable system may have an operating frequency passband range from 5 MHz to 30 MHz or 5 MHz to 40 MHz, for instance.

As mentioned above, the cable system 10 may be a unidirectional cable system. In a unidirectional cable system, the CM 16 is connected to the PSTN 22 or other such network, which provides an upstream telephone connection. The upstream telephone connection may be a standard telephone line connection such as an Integrated Services Digital Network ("ISDN") connection, an Asymmetric Digital Subscriber Line ("ADSL") connection or a wireless connection, for instance.

In that arrangement, the PSTN 22 may be connected to a Telephone Remote Access Concentrator ("TRAC") 24. In the data-over-cable system having an upstream telephone connection, the TRAC 24 may be a Total Control telephone hub by 3Com Corporation of Santa Clara, for instance. However, the TRAC 24 could also be a telephone hub manufactured by a different company, or could take still other forms.

The combination of the CMTS 12 and the TRAC 24 is called a "Telephone Return Termination System" ("TRTS") 26. The TRTS 26 is illustrated as a dashed box in FIG. 1. The CMTS 12 and the TRAC 24 may be at a "headend" of the cable system 10. Alternatively, for instance, the TRAC 24 may be located in a different location and may have routing associations with the CMTS 12. The cable system 10 may also include a plurality of servers such as operations servers, administrative servers or maintenance servers (not shown). Further, the CMTS 12 may connect a plurality of access points to the data-over-cable system 10. Additionally, the plurality of access points may be connected to cable headend access points. Such configurations may be "one-to-one", "one-to-many", or "many-to-many", and may be interconnected to other Local Area Networks ("LANs") or Wide Area Networks ("WANs").

The data-over-cable system 10 may comprise a plurality of network interfaces. As shown in FIG. 1, the TRAC 24 is connected to a data network 28 (e.g. the Internet, an intranet, a LAN or a WAN, for instance) via a TRAC-Network System Interface 30 ("TRAC-NSI"). The CMTS 12 is connected to the data network 28 via a CMTS-Network System Interface ("CMTS-NSI") 32.

Further, the data-over-cable system 10 may comprise a policy/authorization server in communication with the CMTS 12. The authorization/policy server may manage overall policies with an administrative domain such as an Internet service provider, for instance. The CMTS 12 may also comprise an internal authorization module that may serve as a policy enforcement point, for instance.

The system 10 may also comprise a bandwidth manager in communication with the CMTS 12. The bandwidth manager may detect network trends, measure network response time, generate CoS and QoS reports, allocate bandwidth and/or keep records of allocated and available bandwidth.

The present invention is not limited to the use within the data-over-cable system illustrated in FIG. 1. More, fewer, different or equivalent components, connections and interfaces could also be used. Further, the arrangements described herein are shown for purposes of illustration only, and those skilled in the art will appreciate that other arrangements and other elements, such as interfaces or functions, whether or not known in the art, can be used instead, and some elements may be omitted altogether. Additionally, as in most communications applications, those skilled in the art will appreciate that many of the elements described herein are functional entities that may be implemented as discrete components or in conjunction with other components, in any suitable combination and location.

Further, as mentioned above, network entities in the data-over-cable system 10 may be duplicated to provide a back-up in case of failure of one or more network entities. For instance, the network entities may be duplicated in parallel or in series. In a parallel arrangement, for instance, the CMTS 12 comprising an internal authorization/policy server and an internal bandwidth manager may be duplicated. The CMTS 12 and a duplicated CMTS 12' (not shown) may operate simultaneously, with one of them active and the other one in a "standby" state. In such an arrangement, the two units may communicate using a "keep alive" signal, for instance.

Thus, if the primary CMTS 12 fails, the redundant CMTS 12' may immediately start operating, and, ideally, there is no loss of service.

In another exemplary embodiment providing a back-up system, redundant units may operate in a serial manner. In the serial arrangement, units may be cross-connected with a heart-beat controlled shunt on ports. Further, in the serial arrangement, both units may be active, as opposed to a primary device being in an active state and a redundant device being in a standby state, as in the parallel arrangement. In another exemplary embodiment of the present invention, any individual integral components or groups of components may be duplicated.

An operating environment for each CMTS 12, CM 16, CPE 18, TRAC 24 and other network entities of an exemplary embodiment may include a processing system with at least one high speed processing unit and a memory system. In accordance with the practices of persons skilled in the art of computer programming, the present invention is described below with reference to acts and symbolic representations of operations or instructions that are performed by the processing system, unless indicated otherwise. Such acts and operations or instructions could be referred to as being "computer-executed", "processing unit executed", or the like.

It will be appreciated that the acts and symbolically represented operations or instructions include the manipulation of electrical signals by the processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals.

The memory locations may be physical locations that could have particular electrical, magnetic, optical, or organic properties for maintaining data bits.

The data bits may also be maintained on a computer readable medium such as magnetic disks, optical disks, organic disks, and any other volatile or non-volatile mass storage system readable by the processing unit, for instance. The computer readable medium may include cooperating or interconnected computer readable media, which may exist exclusively on the processing system or may be distributed among multiple interconnected processing systems that may be local or remote to the processing system.

Network Device Protocol Stack

Figure 2:
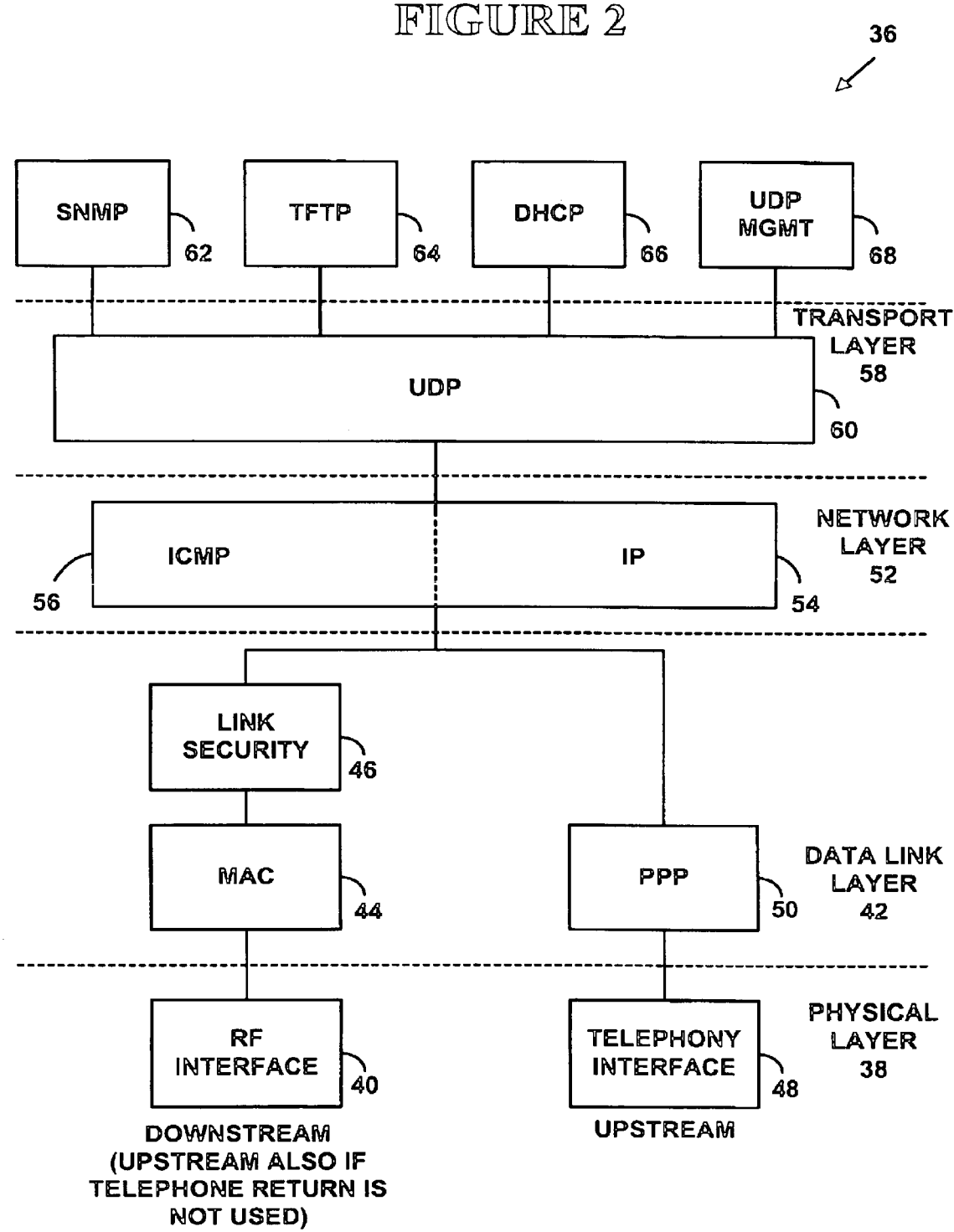
FIG. 2 is a block diagram illustrating a protocol stack for a data-over-cable system.

FIG. 2 is a block diagram illustrating an exemplary protocol stack 36 for network devices in the data-over-cable system 10. In an exemplary embodiment of the present invention, network entities in the data-over-cable system 10 may be DOCSIS compliant. However, other standards may also be used, and the present invention is not limited to the DOCSIS compliant network entities.

FIG. 2 illustrates downstream and upstream protocols used in the CM 16, for instance. As known in the art, the Open System Interconnection ("OSI") model may be used to describe computer networks. The OSI model consists of seven layers including, from lowest to highest, a physical layer, a data-link layer, a network layer, a transport layer, a session layer, a presentation layer and an application layer. The physical layer transmits bits over a communication link. The data-link layer transmits error free frames of data. The network layer transmits and routes data packets.

In bi-directional data-over cable systems, the CM 16 is connected to the cable network 14 in a physical layer 38 via a Radio Frequency ("RF") Interface 40. In an exemplary embodiment of the present invention, for a downstream data transmission, the RF Interface 40 may have an operation frequency range of 50 Mega-Hertz ("MHz") to 1 Giga-Hertz ("GHz") and a channel bandwidth of about 6 to 8 MHz. However, other operation frequencies may also be used, and the invention is not limited to these frequencies. For an upstream transmission the RF Interface 40 may have an operation frequency range of about 5 MHz to 50 MHz. Further, the RF Interface 40 may use a signal modulation method, such as Quadrature Amplitude Modulation ("QAM"). As known in the art, the QAM is used as means for encoding digital information over radio, wire, or fiber optic transmission links. The QAM is a combination of amplitude and phase modulation and is an extension of a multiphase phase-shift-keying. The QAM may have any number of discrete digital levels typically including 4, 16, 64 or 256 levels. In an exemplary embodiment, QAM-64 may be used in the RF Interface 40. However, other operating frequencies and modulation methods could also be used, such as a Quadrature Phase Shift Keying ("QPSK") modulation, for instance. Further, the RF Interface 40 can also be used in a telephony return data-over-cable system.

In a data-over-cable system with a telephony return employed for an upstream connection, the CM 16 may be connected to the PSTN 22 in the physical layer via a telephone interface 48. In an exemplary embodiment, the telephony interface may operate in accordance with one of the standards of the International Telecommunications Union-Telecommunication ("ITU-T") Standardization Sector. The telephone interface 48 may use the ITU-T V.90 standard, for instance. As known in the art, the ITU-T V.90 standard is commonly used in a data link layer of modem communications, and it currently allows data rates as high as 55,600 bits-per-second ("bps"). However, the telephone interface 48 may also operate according to other communications standards, such as V.32 standard, V.34 standard or V.xx standard, where .xx defines any later versions of the standard. Further, the telephone interface 48 could also be an Asymmetric Subscriber Link ("ADSL") interface, an Integrated Services Digital Network ("ISDN") interface or a wireless interface, for instance.

Above the RF Interface 40, there is a data link layer comprising a Medium Access Control ("MAC") layer 44. As known in the art, the MAC layer 44 controls access to a transmission medium via the physical layer 38. The MAC layer 44 may use a protocol described in IEEE 802.14. However, other MAC layer protocols could also be used, such MCNS MAC layer protocol, for instance. Above the MAC layer 44 may be a link security protocol stack 46. The link security protocol stack 46 prevents unauthorized users from making a data connection from cable network 14.

A Point-to-Point Protocol ("PPP") layer 50 is in the data link layer 42 and above the telephony interface 48. As known in the art, the PPP layer encapsulates network layer datagrams over a serial communication link. More information on the PPP protocol may be found on the World Wide Web at the URL "www.ietf.org" in a Request for Comments ("RFC"), RFC-1661.

A network layer 52 is above both the downstream protocol layer and the upstream protocol layer. The network layer 52 comprises an Internet Protocol ("IP") layer 54 and an Internet Control Message Protocol ("ICMP") layer 56. The IP layer 54 corresponds to the OSI layer 3, which is the network layer, but, typically, is not defined as part of the OSI model. As known in the art, the IP is a routing protocol designed to route traffic within a network or between networks. More information on the IP protocol may be found at the URL "www.ietf.org" in RFC-791. The ICMP layer 56 is used for network management. The ICMP provides a plurality of functions, such as an error reporting, reachability testing (e.g., "pinging"), congestion control, route-change notification and performance or subnet addressing, for instance.

More information on the ICMP may be found at the URL "www.ietf.org" in RFC-792.

A transport layer 58 is above the network layer 52. The transport layer 58 comprises a User Datagram Protocol ("UDP") layer 60, which approximately corresponds to the OSI layer 4, the transport layer. As known in the art, the UDP provides a connectionless mode of communication with datagrams. More information on the UDP layer 60 may be found at the URL "www.ietf.org" in RFC-768. However, the transmission layer 58 is not limited to the User Datagram Protocol, and other protocols, such as a Transmission Control Protocol ("TCP"), could also be used. More information on the TCP may be found at the URL "www.ietf.org" in RFC-793.

Above the transport layer 58, there are a Simple Network Management Protocol ("SNMP") layer 62, a Trivial File Transfer Protocol ("TFTP") layer, a Dynamic Host Configuration Protocol ("DHCP") layer 66 and a UDP manager 68. The SNMP layer 62 is used to support network management functions. More information on the SNMP layer may be found at the URL "www.ietf.org" in RFC-1157. The TFTP layer 64 is a file transfer protocol, which is typically used to download files and configuration information. More information on the TFTP layer 64 may be found at the URL "www.ietf.org" in RFC-1350. The DHCP layer 66 is a protocol for passing configuration information to hosts on the IP network 54. More information on the DHCP layer 66 may be found at the URL "www.ietf.org" in RFC-1541, RFC-2131 and RFC-2132. The UDP manager 68 distinguishes and routes packets to an appropriate service. However, more, fewer, or different protocol layers could be used in the data-over-cable system 10.

According to an exemplary embodiment of the present invention, the CM 16 may support transmission and reception of IP datagrams as specified by RFC-791. The CM 16 may be also configured to filter IP datagrams with IP addresses assigned to the CM 16 or CPE 18. Further, the CMTS 12 and the TRAC 24 may also perform filtering of IP datagrams.

During the initialization of the 16, the CMTS 12 transmits to the CM 16 a Termination System Information ("TSI") message, which is a MAC management message. The CMTS 12 may use the TSI message to report to the CM 16 whether or not a bi-directional system is used, for instance. Further, the TSI message may be used to provide the CM 16 with information about the status of the CMTS 12.

Figure 3:
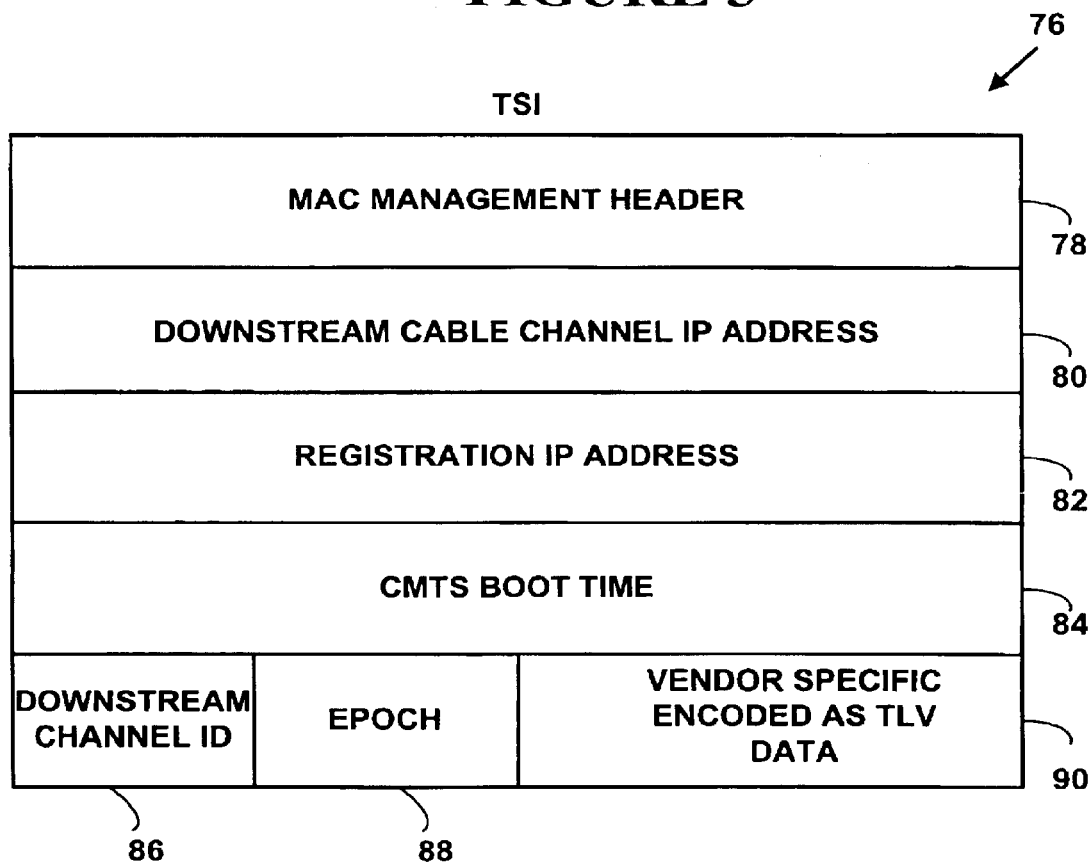
FIG. 3 is a block diagram illustrating a Termination System Information message structure.

FIG. 3 is a block diagram illustrating a structure of an exemplary TSI message 76. The TSI message structure 76 comprises a plurality of fields, such as a MAC management header 78, a downstream cable channel IP address 80, a registration IP address 82, a CMTS boot time 84, a downstream channel identifier 86, an epoch time 88 and vendor specific encoded data 90. However, the TSI message 76 is not limited to these fields, and more, fewer or different fields could also be used in the TSI message 76.

Further in a telephony return data-over-cable system, the CM 16 additionally receives from the CMTS 12 a Telephony Channel Descriptor ("TCD") message defining at least one telephone number that may be used on the CM 16 to establish a communication session with the Telco Remote Access Concentrator 24.

Additionally, during the initialization process, the CM 16 may initiate a Dynamic Host Configuration Protocol ("DHCP") process. The DHCP process is used to provide configuration parameters to hosts on a network such as an IP network, for instance. The DHCP process provides two main services to network clients such as CMs or CPE entities. First, during the DHCP process, IP network addresses are allocated to clients and, second, configuration parameters are provided for network entities.

Figure 4:
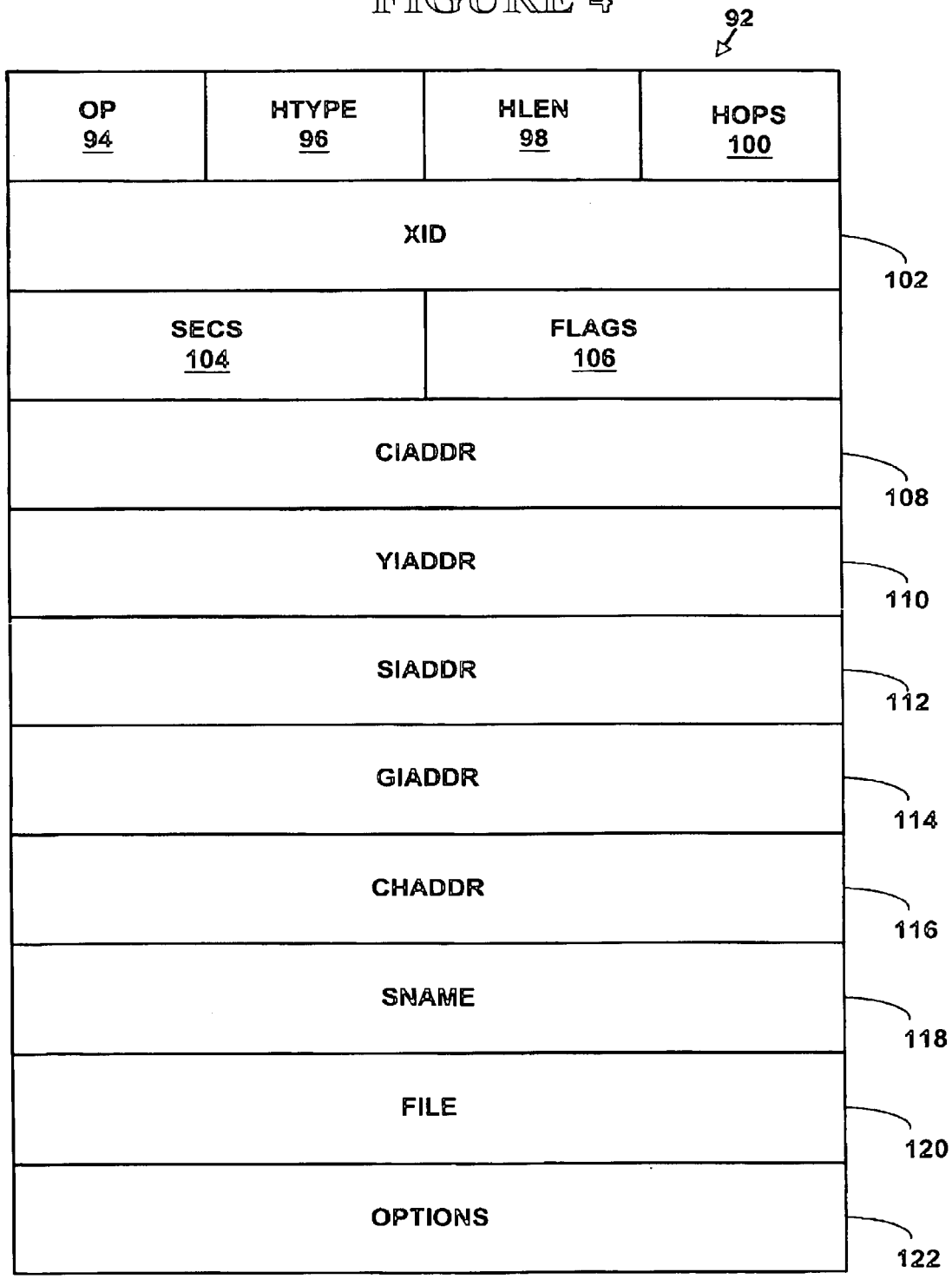
FIG. 4 is a block diagram illustrating a Dynamic Host Configuration Protocol message structure.

FIG. 4 is a block diagram illustrating an exemplary DHCP message structure 92. The format of the DHCP message structure 92 is based on a format of BOOTstrap Protocol ("BOOTP") messages described in RFC-951 and RFC-1542 that may be found at the URL "www.ietf.org." From a network host client's point of view, the DHCP is an extension of a BOOTP mechanism. This property allows the existing BOOTP clients to communicate with DHCP servers without requiring any changes to network host clients' BOOTP initialization software.

To capture a BOOTP relay agent behavior described as part of the BOOTP specification and to allow interoperability of existing BOOTP clients with DHCP servers, a DHCP server uses a BOOTP message format. Further, using the BOOTP relay agents eliminates the necessity of using a DHCP server on each physical network segment.

DHCP 66 message structure 92 includes an operation code field 94 ("op"), a hardware address type field 96 ("htype"), a hardware address length field 98 ("hlen"), a number of hops field 100 ("hops"), a transaction identifier field 102 ("xid"), a seconds elapsed time field 104 ("secs"), a flags field 106 ("flags"), a client IP address field 108 ("ciaddr"), a your IP address field 110 ("yiaddr"), a server IP address field 112 ("siaddr"), a gateway/relay agent IP address field 114 ("giaddr"), a client hardware address field 116 ("chaddr"), an optional server name field 118 ("sname"), a boot file name 120 ("file") and an optional parameters field 122 ("options"). Descriptions for an exemplary DHCP message 92 fields are shown in Table 1.

TABLE 1

| DHCP Parameter | Description |
| --- | --- |
| OP 94 | Message op code/message type. 1 = BOOTREQUEST, 2 = BOOTREPLY. |
| HTYPE 96 | Hardware address type (e.g., '1' = 10 Mps Ethernet). |
| HLEN 98 | Hardware address length (e.g. '6' for 10 Mbps Ethernet). |
| HOPS 100 | Client sets to zero, optionally used by relay-agents when booting via a relay-agent. |
| XID 102 | Transaction ID, a random number chosen by the client, used by the client and server to associate messages and responses between a client and server. |
| SECS 104 | Filled in by client, seconds elapsed since client started trying to boot. |
| FLAGS 106 | Flags including a BROADCAST bit. |
| CIADDR 108 | Client IP address; filled in by client in DHCPREQUEST if verifying previously allocated configuration parameters. |
| YIADDR 110 | 'Your' (client) IP address. |
| SIADPR 112 | IP 54 address of next server to use in bootstrap; returned in DHCPOFFER, DHCPACK and DHCPNAK by server. |
| GIADDR 114 | Gateway relay agent IP 54 address, used in booting via a relay-agent. |
| CHADDR 116 | Client hardware address (e.g., MAC layer 44 address). |
| SNAME 118 | Optional server host name, null terminated string. |
| FILE 120 | Boot file name, terminated by a null string. |
| OPTIONS 122 | Optional parameters. |

Table 1

The DHCP message structure 92 shown in FIG. 4 may be used to discover IP network host interfaces in the data-over-cable system 10. A network host client such as the CM 16 may use the DHCP process to dynamically acquire, verify or renew an IP address and configuration parameters. During a typical use of the DHCP process, the CM 16 and CPE 18 broadcast a "DHCPDISCOVER" message to receive configuration settings such as an IP address for the CM 16 and an IP address for the CPE 18. During the DHCP process, the DHCP servers may respond with DHCPOFFER messages including configuration parameters. Then, the CM 16 or the CPE 18 may select one of the DHCP servers and sends a DHCPREQUEST message to the selected server.

Specialized DHCP Proxy in a Data-over-cable System

FIG. 5 is a block diagram illustrating a data-over-cable system 150 in which methods for a specialized DHCP proxy functionality may be employed. In addition to the network devices described in reference to FIG. 1, FIG. 5 illustrates multiple DHCP proxies (i.e., network host interfaces) as a single DHCP proxy block 152 connected to the TRAC 24. As known in the art, the DHCP proxies 152 accept DHCP messages originally from the CM 16 destined for DHCP servers 154 connected to network host interfaces 156 (e.g., IP interfaces) available on the CMTS 12 since the TRAC 24 has no direct access to the DHCP servers 154. Further, the DHCP proxies 152 are not used in the two-way data-over-cable systems, where a cable connection is used as an upstream connection. Further, FIG. 5 illustrates the CM 16 in communication with a database 158. According to an exemplary embodiment, the CM 16 creates a database entry record for each CPE in communication with the CM 16. In one embodiment, each database entry record includes CPE identification data and DHCP data associated with each CPE. For example, among many other parameters that will be described in greater detail below, the DHCP data associated with each CPE include DHCP server's identification data such as a DHCP server identifier, a DHCP server IP address, and a DHCP server's name associated with each CPE. FIG. 5 illustrates the external database 158 in communication with the CM 16. However, the exemplary embodiment is not limited to the external database, and an internal CM's database can also be used to keep database entry records for the CPEs associated with the CM 16. Further, the exemplary embodiment is not limited to the network devices illustrated in FIG. 5, and more, fewer, different or equivalent network devices could also be used.

Network devices for exemplary embodiments include network devices that can interact based on standards proposed by the Data-Over-Cable-Service-Interface-Specification ("DOCSIS") standards from the Multimedia Cable Network Systems ("MCNS"), the Institute of Electrical and Electronic Engineers ("IEEE"), International Telecommunications Union-Telecommunication Standardization Sector ("ITU"), Internet Engineering Task Force ("IETF"), and/or Wireless Application Protocol ("WAP") Forum. However, network devices based on other standards could also be used. DOCSIS standards can be found on the World Wide Web at the Universal Resource Locator ("URL") "ww.cablemodem.com." IEEE standards can be found at the URL "www.ieee.org." The ITU, (formerly known as the CCITT) standards can be found at the URL "www.itu.ch." IETF standards can be found at the URL "www.ietf.org." The WAP standards can be found at the URL "www.wapforum.org."

According to an exemplary embodiment, the CM 16 acts as a DHCP proxy for all or a predetermined number of CPEs in communication with the CM 16. Thus, in one embodiment, the CM 16 interacts with the DHCP servers 154 in place of the CPE 18, and interacts with the CPE 18 in place of the DHCP servers 154. In such an embodiment, when the CM 16 receives a DHCP request message from the CPE 18, the CM 16 creates a special proxy task for the CPE 18 to allow for the proxy functionality on the CM 16.

FIGS. 6A and 6B illustrate an exemplary method 200 for obtaining addresses for customer premises equipment entities, where a cable modem has a specialized DHCP proxy's functionality. According to an exemplary embodiment, the method 200 is described in a two-way data-over-cable system; however, the method 200 could also be employed in a Telco return data-over-cable system or any system having a different type of the return path such a wireless return path, for example.

Referring to FIG. 6A, at step 202, a first network device receives a first protocol message from a second network device in communication with the first network device. According to an exemplary embodiment, the first protocol message is used to discover a network host interface address, and the second network device broadcasts the first protocol message on its local network. Further, in one embodiment, the first protocol message may include options that suggest values for a network address and lease duration.

At step 204, when the first network device receives the first protocol message, the first network device create a specialized proxy task for the second network device. According to an exemplary embodiment, when the specialized proxy task is created on the first network device for the second network device, the first network device intercept all first protocol messages from the second network device, and route them to the created specialized proxy task.

At step 206, the first network device creates a record for the second network device in a database and stores identification data of the second network device in the record. According to an exemplary embodiment, to create the record with identification data of the second network device, the first network device uses the received first protocol message. In one embodiment, the first network device retrieves from the first protocol message a network address of the second network device and a client identifier parameter associated with the second network device. However, the exemplary embodiment is not limited to storing only these parameters associated with the second network device, and more parameters from the first protocol message could also be stored in the record of the second network device.

At step 208, the first network device forwards the first protocol message to first protocol network servers. At step 210, the first network device receives one or more first protocol response messages from the first protocol network servers. According to an exemplary embodiment, each first response message includes an available network address, as well as, a lease interval, a renewal time and rebind time.

At step 212, when the first network device receives the at least one first protocol response message from the first protocol servers, the first network device modifies parameters in the first protocol response messages. According to an exemplary embodiment, the first network device modifies the lease, renew and rebind time intervals specified in the first response messages. In one embodiment, the first network device changes the lease, renew and rebind time intervals to shorter values.

At step 214, the first network device stores the received and the modified lease time intervals in the database record associated with the second network device. Referring to FIG. 6B, at step 216, the first network device forwards the modified first protocol response messages to the second network device. When the second network device receives one or more modified first protocol response messages from one or more first protocol network servers, at step 218, the second network device selects one first protocol network server based on the configuration parameters offered in the modified first protocol response messages. Further, the second network device generates a first protocol request message to request configuration parameters from the selected first protocol network server. According to an exemplary embodiment, the first protocol request message includes an identifier of the first protocol network server specified in the first protocol response message selected by the second network device.

At step 220, the first network device intercepts the first protocol request message and forwards it to the selected first protocol network server specified in the first protocol request message. When the selected first protocol network server receives the first protocol request message, the first protocol network server responds with a first protocol acknowledgement message to confirm a receipt of the second message and allocation of the configuration parameters specified in the first protocol response message. According to an exemplary embodiment, the first protocol acknowledgement message includes configuration parameters for the second network device such as a routable network address assigned for the second network device and lease time intervals for the allocated network address. At step 222, the first network device intercepts the first protocol acknowledgement message from the first protocol network server. When the first network device intercepts the first protocol acknowledgement message, at step 224, the first network device stores the network server's data in the database record associated with the second network device. Further, a task is created on the first network device to renew the network address for the second network device prior to an end of the lease time interval specified by the first protocol network server, so that the first network device may renew the lease in advance, and the lease may be renewed even if the second network device is turned off.

At step 226, the first network device modifies the first protocol acknowledgement message. According to an exemplary embodiment, the first network device modifies the renew and rebind lease time intervals using the values stored in the database record associated with the second network device and the selected first protocol network server. To do that, the first network device retrieves the modified lease time interval values that the second network device received in the first protocol response message associated with the selected first protocol network server. At step 228, the first network device forwards the modified first protocol acknowledgement message to the second network device.

In the exemplary method 200 described in reference to FIGS. 6A and 6B, the first network device is the CM 16, the second network device is the CPE 20, the database is the database 158, and the first protocol servers are the DHCP servers 154. Further, the first protocol messages are DHCP messages, where the first protocol message received from the first network device at step 202 is a DHCPDISCOVER message, the first protocol response messages are DHCPOFFER messages, the first protocol request message is a DHCPREQUEST message, and the first protocol acknowledgement message is a DHCPACK message. However, the exemplary embodiment is not limited to these network devices and messages, and more, fewer, different or equivalent network devices and messages could also be used.

According to an exemplary embodiment, when the CM 16 creates a DHCP proxy task for some or all CPEs associated with the CM 16, and further establishes an identification record for each CPE associated with the created proxy tasks, the CM 16 interacts with the CPE of record acting as a DHCP server. In the exemplary embodiment, the CPE for which a proxy task has been created on the CM 16, maintains two time intervals that specify the times at which the CPE tries to renew its network address lease. The first time interval specifies a time at which the CPE enters a renewing state and attempts to communicate with its DHCP network server that originally issued a routable network address for the CPE. The second time interval is a time at which a CPE enters a rebinding state and attempts to contact any DHCP network server. As known in the art, a renewing time interval ends prior to an end of a rebinding time interval so that a CPE initiates renewal of its assigned network address before engaging in a lengthy DHCP DISCOVER process. Typically, at the end of a renewing time interval, a CPE sends a DHCPREQUEST message to a DHCP network server that was selected by the CPE. However, according to an exemplary embodiment, the CM 16 acts as a DHCP proxy, so that, the CPEs may keep the same network address for a longer duration of time.

FIGS. 7A and 7B are a flow chart illustrating an exemplary method 250 for a lease renewal according to an exemplary embodiment. In the exemplary embodiment associated with the method 250, a first network device keeps a database record for each network device having a proxy task created on the first network device. According to an exemplary embodiment, the database record includes an original lease time interval, lease renewal time interval, rebind time interval offered by a first protocol network server selected by each network device having a first protocol proxy task. Further, the database record includes modified renewal and rebind lease time interval values. Additionally, the database record includes identification data of each network device having a first protocol proxy task and data of a first protocol network server selected by each network device having a record. According to an exemplary embodiment shown in FIGS. 7A and 7B, the first network device interacts with a second network device as if the first network device was the first protocol network server selected by the second network device. Further, the first network device interacts with the first protocol network server as if the first network device was the second network device.

Referring to FIG. 7A, at step 252, the first network device intercepts a first protocol request message from the second network device directed to a first protocol network server. According to an exemplary embodiment, when the second network device creates the first protocol request message, the second network device requests a lease renewal of the same routable network address and, further, identifies its routable network address and its client identifier in the first protocol request message. Further, according to an exemplary embodiment, since the second network device has received a modified renewal lease time interval from the first network device at an earlier stage of the process, the second network device requests the renewal of the routable network address at the end of the modified renewal time interval.

At step 254, the first network device retrieves a database record associated with the second network device from a database. In one embodiment, the first network device has an internal database for storing identification records of network devices for which specialized first protocol proxy tasks have been created. Alternatively, the first network device may communicate with an external database that stores the identification records of the network devices associated with the specialized first protocol proxy tasks. According to an exemplary embodiment, the modified renewal time interval is shorter than the original renewal time interval assigned to the second network device by the first protocol network server. Thus, the first network device may use the original lease time interval stored in the database to assign a new time interval for the second network device. In one embodiment, the first network device may provide the remaining time of the original lease time interval for the second network device. However, other embodiments are possible as well. For example, when the first network device determines the remaining lease time interval, the first network device may provide a portion of the remaining time interval for the second network device. Further, the first network device acts as the first protocol network server associated with the second network device. In order to do that, the first network device retrieves the first protocol network server's identification data from the identification record associated with the second network device.

At step 256, the first network device generates a first protocol response message for the second network device using the first protocol network server identification data retrieved from the record associated with the second network device, so that the first protocol response message seems to be as generated by the first protocol network server. In one embodiment, the first protocol server data includes a network server's IP address, server's identifier and server's name. The first network device uses the retrieved server's idnentification data to generate the first protocol response message. Further, the first network device specifies a second renewal time interval, a second rebind time interval and a second lease period in the first protocol response message. As mentioned in the proceeding paragraph, the second renewal and rebind time intervals are the remaining time intervals of the original renewal and rebind time intervals.

However, other embodiments are also possible such as the second renewal and rebind time intervals being shorter than the remaining time of the original renewal and rebind time intervals. In such an embodiment, the process of renewing the lease by the second network device is repeated.

At step 258, the first network device sends the first protocol response message to the second network device. According to the exemplary embodiment, the first protocol response message defines the second renewal and rebind time intervals.

Additionally, according to an exemplary embodiment, at step 260, the first network device monitors the original renewal time interval assigned to the second network device by the first protocol network server. In one embodiment, when the first network device stores the original renewal and rebind time intervals assigned to the second network device, the first network device artificially sets modified renewal and rebind time intervals a few seconds ahead of the original lease time intervals. By doing that, the first network device has the ability to initiate a lease renewal process the lease for the second network device prior to the end of the originally assigned renewal time interval.

At step 262, the first network device determines whether the modified renewal time set on the first network device is ending. If the first network device determines that it is not a time to renew the network address lease for the second network device, the method 250 continues at step 260. Otherwise, the first network device initiates interaction with the first protocol server pretending to be the second network device and initiating a lease renewal process for the routable network address of the second network device.

Referring to FIG. 7B, at step 264, the first network device generates a first protocol request message using identification data of the second network device and the first protocol server's identification data from the database record associated with the second network device. According to an exemplary embodiment, to generate the first protocol request message, the first network device retrieves from the database record of the second network device a network address of the second network device, a client identifier of the second network device, and a transaction identifier assigned to the second network device. Further, the first network device specifies in the first protocol request message a time that has elapsed from a boot time of the second network device. Additionally, in order to send the first protocol message to the first protocol network server associated with the second network device, the first network device retrieves the first protocol network server's identification data from the database. Using that data, the first network device properly sets the destination of the first protocol request message.

At step 266, the first network device sends the first protocol request message to the first protocol network server specified in the second network device's database record. According to an exemplary embodiment, the first protocol request message defines a request to renew a network address assigned to the second network device. At step 268, the first network device determines whether the first protocol server responded to the network address renewal first protocol request message. If the first protocol network server responded to the request, the first network device determines whether the response message from the first message includes a renewed network address for the second network device. If the first protocol server declines the renewal of the network address for the second network device, at step 270, the first network device resends the first protocol request message to the first protocol network server. In one embodiment, the first network device may resend the first request message to the first protocol server periodically. Alternatively, the first network device resends the first request message more often as the renewal lease time interval ceases.

At step 272, if the first protocol network server receives the response message from the first protocol network server, and the response message includes the renewed lease of the second network device's routable network address, the first network device updates the database identification record associated with the second network device. In one embodiment, the first network device retrieves from the first protocol response message and stores in the database record of the second network device a new lease time interval, a new renewal time interval and a new rebind time interval specified in the received message.

According to an exemplary embodiment, the second network device tries to renew its network address lease after the first network device communicates with the first protocol network server since the renewal lease time set on the first network device is set to an earlier time than the renewal lease time provided to the second network device. Thus, at some point after the first network device receives the first protocol response message from the first protocol network server, the second network device tries to renew its network address lease and generates a first protocol request message. According to an exemplary embodiment, at step 274, the first network device intercepts the first protocol request message from the second network device so that the first protocol request message is not forwarded to the first protocol network server specified by the second network device in the intercepted request message.

At step 276, the first network device retrieves the data received earlier from the first protocol network server to generate a lease renewal first protocol response message for the second network device, thus, making the renewal process faster for the second network device. Further, once again, when the first network device generates the response message for the second network device, the first network device defines in the response message renewal and rebind lease time intervals that are shorter that the time intervals received from the first protocol network server at step 272. Additionally, when the first network device generates the first protocol response message, the first network device once again pretends to be the first protocol network server. To do that, when the first network device generates the first protocol response message, the first network device uses the first protocol network server's identification data stored in the record of the second network device. In one embodiment, the first network device uses the IP address of the first protocol network server, the server's name parameter or other server's identifiers specified in the database record.

At step 278, the first network device sends the generated first protocol response message to the second network device.

According to the exemplary method 250 illustrated in FIGS. 7A and 7B, the first network device is the CM 16, the second network device is the CPE 18, the first protocol network server is the DHCP server 154, and the database is the database 158. Further, according to an exemplary embodiment, the first protocol request messages are DHCPREQUEST messages, and the first protocol response messages are DHCPACK messages. However, the exemplary embodiment is not limited to these network devices and messages, and fewer, more, different or equivalent network devices and messages could also be used. For example, in the exemplary embodiment, the first network device could be a broadband access network device, a home gateway or a DSL modem.

According to an exemplary embodiment, an IP address of the CPE 18 leased by the DHCP server 154 may be retained for a longer duration time because of the DHCP proxy functionality on the CM 16. In one embodiment, the CM 16 monitors the state of the CPE 18 and has the ability to renew the CPE's lease when the CPE is turned off, therefore, keeping the IP address of the CPE 18 reserved for a longer duration of time. Further, as known in the art, when any CPE is rebooted, even though its original lease time might not have expired, a CPE has to go through an entire DHCP DISCOVER process since the lease would have been lost during the reboot. However, with the CM's DHCP proxy functionality, the CM 16 may respond to the CPE 18, and no data has to be exchanged between the CPE 18 and the DHCP server 154. Therefore, the CM's DHCP proxy functionality greatly reduces the upstream traffic as well as the load on the DHCP server 154, during mass re-registrations following a head-end system reboot, for example.

Figure 8A:
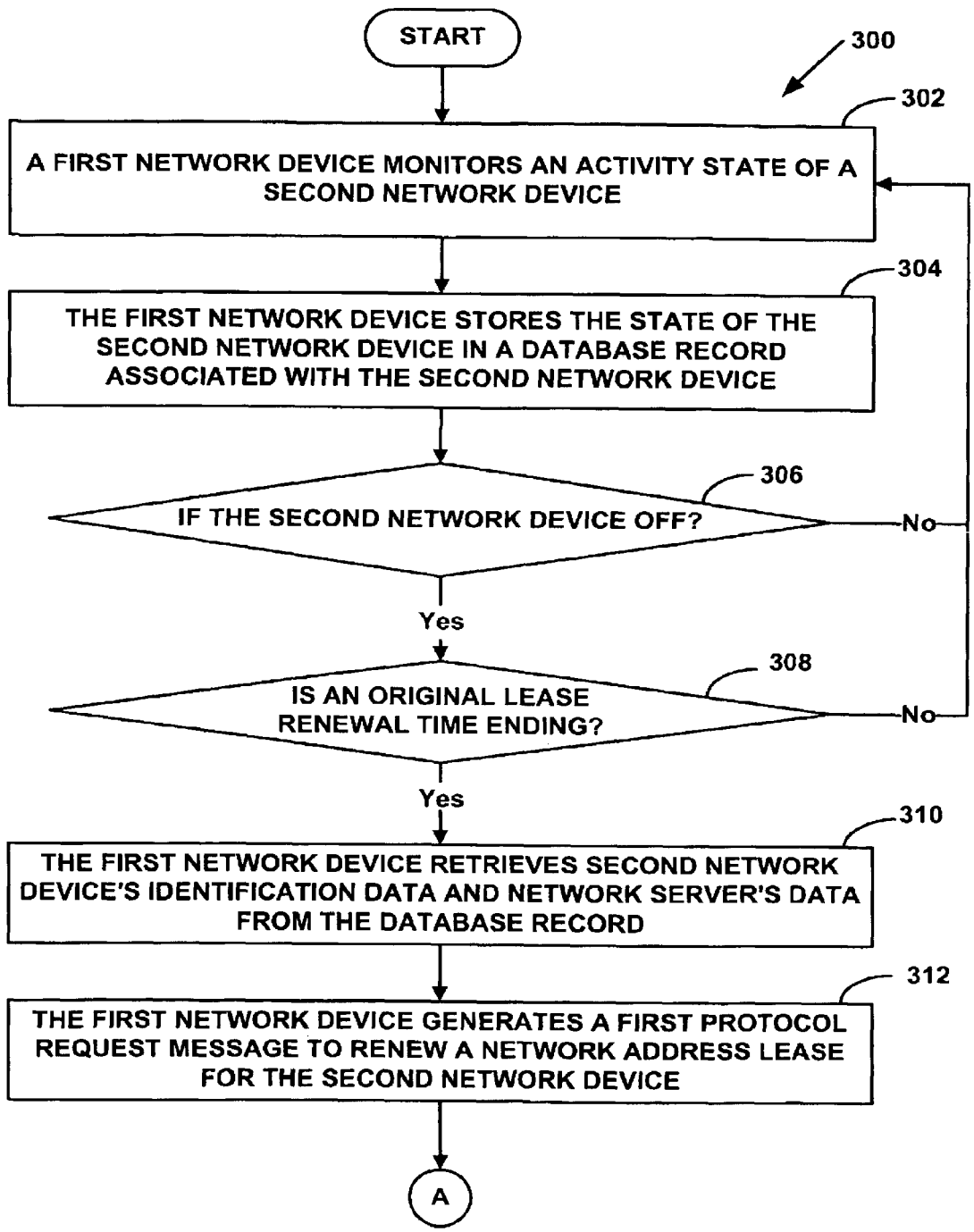

FIGS. 8A and 8B are flow charts illustrating a method 300 for monitoring the state of a customer premise equipment entity and renewing a network address lease for the customer premise equipment entity according to an exemplary embodiment.

Referring to FIG. 8A, at step 302, a first network device monitors an activity state of a second network device in communication with the first network device. In one embodiment, the first network device may monitor the activity state of the second network device periodically. At step 304, the first network device stores the state of the second network device in a database record associated with the second network device. In one embodiment, the database may be an internal database of the first network device. Alternatively, the database may be an external database.

At step 306, the first network device determines whether the second network device is turned off (the second network device is not using its routable network address). If the second network device is not turned off, the method 300 continues at step 302. However, if the second network device is turned off, at step 308, the first network device determines whether it is a time to renew a network address lease for the second network device from the first protocol network server. According to an exemplary embodiment described in reference to the proceeding figures, the first network device keeps database records of network address lease time intervals associated with some or all network devices having specialized first protocol proxy tasks created on the first network device. Further, when the first network device creates that record, the first network device sets up earlier lease renewal times for the network devices so that the first network device may renew the leases in advance. Thus, according to an exemplary embodiment, the first network device may monitor the lease renewal time for the second network device using lease data in the second network device's database record. If the first network device determines that it is not a time to renew a network address lease for the second network device, the method 300 continues at step 302.

However, if the first network device determines that the advanced address lease time is up, at step 310, the first network device retrieves the identification data of the second network device and the identification data of the first protocol server associated with the second network device. According to an exemplary embodiment, the identification data of the second network device includes, among other parameters, a MAC layer network address of the second network device, a unique client identifier associated with the second network device and a transaction identifier that has been assigned by the first protocol network server. Further, the first protocol network server's identification data includes an IP address of the first protocol network server associated with the second network device, a server's name, and a relay agent's IP address. However, the exemplary method 300 is not limited to these parameters, and fewer, more, different or equivalent parameters could also be stored in the second network device's database record.

At step 312, the first network device generates a first protocol request message using the retrieved identification data of the second network device and the identification data of the first protocol network server. According to an exemplary embodiment, the first protocol request message is generated by the first network device to renew the original network address lease for the second network device. Further, according to an exemplary embodiment, the first network device generates the first request message in such a manner so that when the first protocol network server receives the message, the first protocol network server assumes that the first protocol request message has originated from the second network device. In order to that, when the first network device generates the first protocol request message, the first network device inserts the MAC address associated with the second network device into a source field of the first protocol request message. Further, the first network device inserts the MAC address of the second network device into a client's hardware address field, the second network device's identifier into a client identifier option field, and the transaction identifier into an XID field of the first protocol request message. Additionally, the first network device inserts a time value in a secs field, where the time value inserted by the first network device reflects a time that would have elapsed from a boot time of the second network device.

Referring to FIG. 8B, at step 314, the first network device sends the first protocol request message to the first protocol network server specified in the database record of the second network device. At step 316, the first network device receives a first protocol response message from the first protocol network server. According to an exemplary embodiment, the first protocol response message may include a confirmation of the network address renewal or a decline of the network address lease renewal. When the first protocol response message specifies a decline to renew the requested network address, the first protocol response message could include a lease offer of a new network address for the second network device. At step 318, the first network device determines whether the first protocol network server has renewed the requested network address lease for the second network device. Since the renewal lease time on the first network device is set to an earlier time than the original lease time, if the first network server does not renew the lease for the second network device, the method 300 continues at step 314, 316, and 316 where the first network device tries to re-send the first protocol request message. According to an exemplary embodiment, if the first protocol network server rejects the renewal of the requested network address lease after the first network device sends the first protocol request message a predetermined number of times, the first network device may try to obtain a new network address lease from first protocol network servers via a DHCP DISCOVER process.

If the first protocol response message from the first protocol network server includes renewed network address lease intervals for the requested network address, at step 320, the first network device stores the new lease time intervals in the database record associated with the second network device. According to an exemplary embodiment, the new lease time intervals define a renewal time interval and a rebind time interval, for example. Further, similarly to the original lease time interval, the first network device sets up shorter values for the lease renewal so that the first network device can renew the network address lease in advance, thus, increasing the probability of the retaining the same network address by the second network device.

According to an exemplary embodiment, since the second network device was off when the first network device renewed the network address lease for the second network device, at step 320, the first network device may receive a first protocol request message from the second network device at a later time. Since the second network device was off when the original lease time has ended, the second network device would have lost the network address lease in a typical system. However, according to an exemplary embodiment, because of the specialized first protocol functionality on the first network device, the leased network address of the second network device is retained for a longer time duration. At step 322, the first network device intercepts the first protocol request message from the second network device, prior to forwarding the message to the first protocol network server specified in the first protocol request message.

At step 324, since the first network device has already renewed the network address lease for the second network device, the first network device generates a first protocol reply message for the second network device. According to an exemplary embodiment, the first network device generates the first protocol reply message in such a manner so that when the second network device receives the first protocol reply message, the second network device assumes that the first protocol reply message has been generated by the first protocol network server. To do that, the first network device retrieves the first protocol server's identification data from the database record associated with the second network device. When the first network device generates the first protocol reply message, the first network device inserts the first protocol network server's IP address into a source IP address field and into a server's identifier option field, the first protocol network server's name into a server's name field, and the relay agent's IP address into a gateway IP field. Further, the first network device specifies the lease time intervals in the first protocol reply message using the lease time intervals provided by the first protocol network server during the lease renewal. According to an exemplary embodiment, the first network device inserts into the first protocol reply message lease time intervals that are shorter than the lease time intervals provided by the first protocol network server during the lease renewal process. At step 326, the first network device sends the first protocol reply message to the second network device.

According to the exemplary method 300, the first network device is the CM 16, the second network device is the CPE 18, and the first protocol network server is the DHCP server 154. However, the exemplary embodiment is not limited to these network devices and fewer, different or equivalent network devices could also be used. For example, the first network device could be a home gateway or a DSL modem. Further, according to the exemplary method 300, the first protocol request messages are DHCPREQUEST messages, and the first protocol reply messages are the DHCPACK messages. However, the exemplary embodiment is not limited to DHCP messages and different or equivalent protocols could also be used.

Typically, during a DHCP process, the CM 16 is not given a routable IP address, and the CM 16 receives a private IP address. There are many reasons for assigning a private IP address to the CM 16; however, the most important reasons are the IP address conservation and security. Presumably, a CM that cannot be addressed from the outside is harder for other network devices to hack into. On the other hand, CPEs are assigned publicly routable IP addresses. As known it the art, the CPEs' data flows through a CM associated with the CPEs. These two factors give a CM all the information it needs to obtain a publicly routable IP address. However, simply sniffing the CPE's data flow to get a CPE's IP address may not be satisfactory. If a CPE is turned off, a CM cannot sniff the CPE's traffic, and in typically used systems, the IP address lease of the CPE 18 would expire anyway. Therefore, a CM must not only borrow a publicly routable IP address of a CPE, but also has to have the ability to renew the IP address lease for the CPE. According to the exemplary embodiments described in reference to earlier figures, the CM 16 has the ability to renew the IP leases by proxying the DHCP process.

Therefore, according to an exemplary embodiment, when one of the CPEs associated with the CM 16 is turned off, the CM 16 may "borrow" an IP address associated with the turned off CPE to access network devices on public networks. For example, the CM 16 could have an application arranged to access a mail network server located on a public network and check mail for the turned off CPE 18. Alternatively, the CM 16 could use the IP address of the turned off CPE 18 to respond to network devices that try to initiate communication sessions with the turned off CPE 18.

Figure 9:
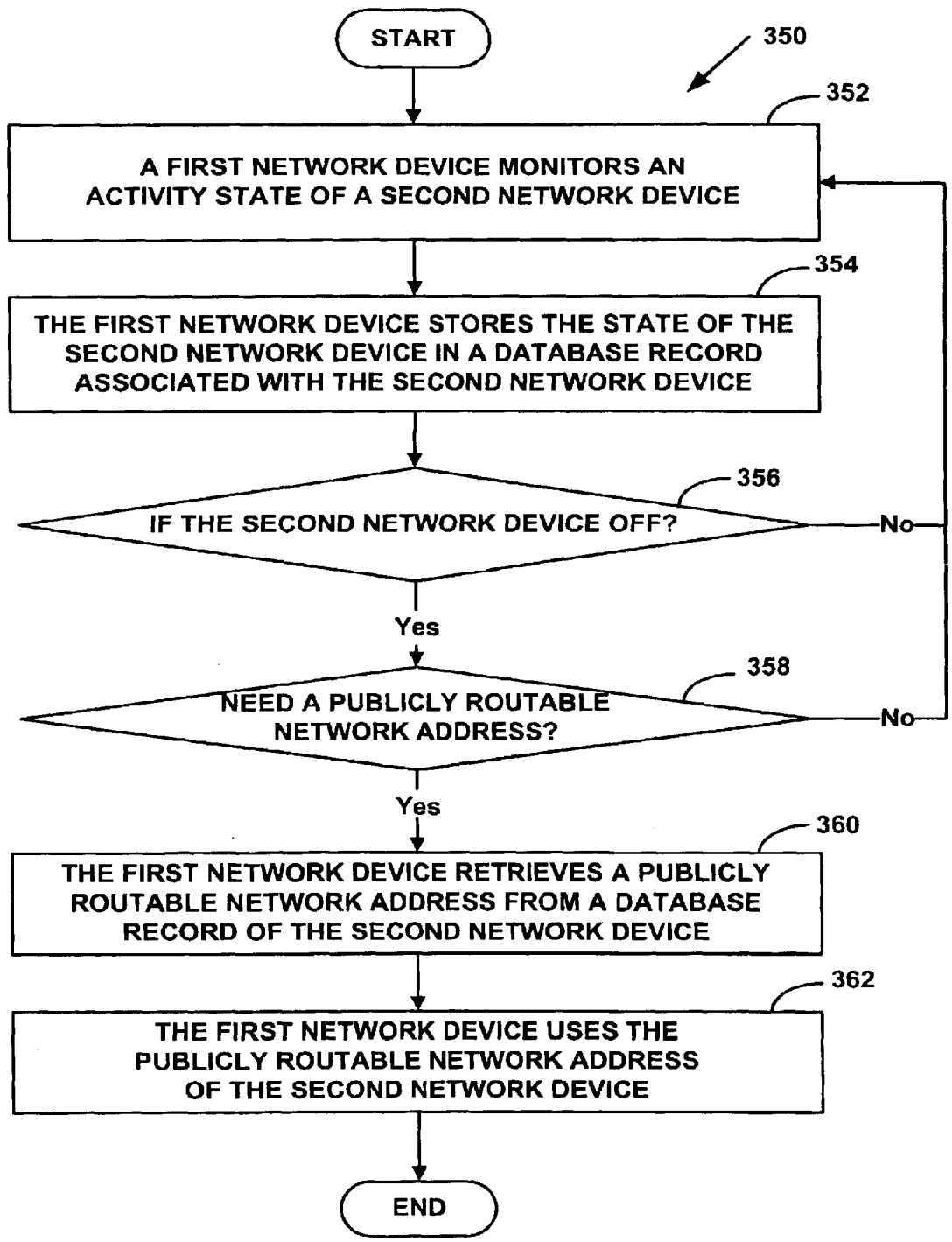
FIG. 9 is a flow chart illustrating a method for obtaining a publicly routable network address for a network device according to an exemplary embodiment.

FIG. 9 is a flow chart illustrating a method 350 for obtaining and using a publicly routable network address on a first network device from a second network device according to an exemplary embodiment.

At step 352, the first network device monitors an activity state of the second network device. In one embodiment, the first network device may monitor an activity state of the second network device periodically. Further, if there is more than one network device associated with the first network device, the first network device may monitor an activity state of each such network device. At step 354, the first network device stores the activity state of the second network device in a database. In one embodiment, the first network device may have an internal database for storing the activity states. Alternatively, the database could be an external database.

At step 356, the first network device determines whether the second network device is turned off (the second network device is not using its publicly routable IP address). If the second network device is not turned off, the method 350 continues at step 352, 354, and 356, where the first network device may periodically monitor the activity state of the second network device. If the second network device is turned off, at step 358, the first network device determines whether any application on the first network device requires a publicly routable IP address. However, the exemplary method 350 is not limited to determining whether only applications on the first network device require a publicly routable IP address. For example, the first network device may communicate with other network devices that may need a routable IP address for a short period of time. If, at step 358, the first network device determines that no applications on the first network device or no other network devices need a routable IP address, the method 350 continues at steps 352, 354, 356 and 358.

If an application on the first network device or a network device in communication with the first network device require a publicly routable IP address, at step 360, the first network device retrieves the publicly routable IP address of the second network device from a database record of the second network device. At step 362, an application on the first network device may use the retrieved publicly routable IP address of the second network device. For example, an internal application on the first network device may use the retrieved publicly routable IP address of the second network to access a mail server on a public network and check mail for the second network device.

According to the exemplary method 350, the first network device is the CM 16 and the second network device is the CPE 18. However, the exemplary embodiment is not limited to these network devices and different or equivalent network devices could also be used. Further, according to an exemplary embodiment associated with the described method 350, the first network device additionally monitors the network address lease time intervals while the second network device is turned off. The process of monitoring and renewing the network address lease for the second network device has been described in FIGS. 8A and 8B.

An operating environment for the described embodiments includes a processing system with at least one high speed Central Processing Unit ("CPU") or other processing unit and a memory system. In accordance with the practices of persons skilled in the art of computer programming, the described embodiments with reference to acts and symbolic representations of operations or instructions that are performed by the processing system, unless indicated otherwise. Such acts and operations or instructions are sometimes referred to as being computer-executed, or "CPU executed."

It will be appreciated that the acts and symbolically represented operations or instructions include the manipulation of electrical signals by the CPU. An electrical system with data bits causes a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium readable by the CPU or other processing unit. The computer readable medium includes cooperating or interconnected computer readable media, which exist exclusively on the processing system or are distributed among multiple interconnected processing systems that may be local or remote to the processing system.

Further, in view of many embodiments to which the principles of the invention may be applied, it should be understood that the illustrated embodiments are exemplary embodiments and should not limit the present invention as defined by the claims. For example, the DHCP proxy functionality has been described as applied to only one CPE associated with the CM 16. However, the DHCP proxy functionality may be instantaneously applied to any number of CPEs associated with the CM 16. Further, the exemplary embodiments have been described in reference to a data-over-cable network. However, the present invention is not limited to the data-over-cable networks, and it could also be used in networks capable of transmitting data associated with an Asynchronous Transfer Mode protocol, Asymmetric Digital Subscriber Line protocol, Voice over Internet Protocol, Internet Protocol or a protocol associated with cable television data streams. Further, the described methods are not limited to a data-over-cable system, and could also be applied in other types of networks such as an Ethernet network or a network having broadband wireless links, fixed wireless links, DSL links or fiber optic links, for example. Further, unless specified to the contrary, the steps of the flow charts may be taken in sequence other than those described, and more, fewer or equivalent elements or components could also be used.

What is claimed:

1. In a data-over-cable system, a method for proxying first protocol network services, the method comprising:

creating a database record comprising identification data of a second network device and identification data of a first protocol network server selected by the second network device;

intercepting at a first network device a first protocol offer message from the first protocol network server to the second network device; wherein the first protocol offer message comprises a routable network address for the second network device and a lease time interval for the routable network address;

modifying the lease time interval in the first protocol offer message intercepted on the first network device;

sending the modified first protocol offer message from the first network device to the second network device;

receiving a first protocol request message on the first network device from the second network device prior to an end of the modified lease time interval provided to the second network device, the first protocol request message defining a lease renewal request for the routable network address associated with the second network device;

intercepting the first protocol request message on the first network device prior to the first protocol network server receiving the first protocol request message;

generating a first protocol response message on the first network device using the identification data of the first protocol network server, the lease time interval provided in the first protocol offer message and the modified lease time interval; and sending the first protocol response message to the second network device.

2. A computer readable medium having stored therein instructions for causing a central processing unit to execute the method of claim 1.

3. The method as claimed in claim 1, wherein the first protocol network services comprise Dynamic Host Configuration network services.

4. The method as claimed in claim 1, further comprising, storing the lease time interval received in the first protocol offer message and the modified lease time interval in the database record associated with the second network device.

5. The method as claimed in claim 1, wherein the first network device comprises a cable modem, the second network device comprises a customer premise equipment entity and the first protocol network server comprises a Dynamic Host Configuration Protocol server.

6. The method as claimed in claim 1, wherein the first protocol offer message comprises a Dynamic Host Configuration Protocol Offer message.

7. The method as claimed in claim 1, wherein the first protocol response message comprises a Dynamic Host Configuration Protocol message.

8. The method as claimed in claim 1, further comprising, specifying a remaining lease time interval in the first protocol response message, wherein the remaining lease time interval is determined using the lease time interval specified in the first protocol offer message and further using the modified lease time interval.

9. The method as claimed in claim 1, further comprising:
determining whether the second network device is not using the routable network address; and if so,
using the routable network address of the second network device on the first network device.

10. In a data-over-cable system, a method for proxying first protocol network services, the method comprising:
creating a database record comprising identification data of a second network device and identification data of a first protocol network server selected by the second network device;
intercepting at a first network device a first protocol offer message from the first protocol network server to the second network device; wherein the first protocol offer message comprises a routable network address for the second network device and a lease time interval for the routable network address;
modifying the lease time interval in the first protocol offer message intercepted on the first network device;
sending the modified first protocol offer message from the first network device to the second network device;
generating a first protocol request message on the first network device using the identification data of the second network device the first protocol request message defining a lease renewal request for the routable network address of the second network device;
sending the first protocol request message from the first network device to the first protocol network server prior to an expiration of the lease time interval specified in the first protocol offer message received from the first protocol network server; and
receiving a first protocol reply message from the first protocol network server, the first protocol reply message defining a new lease time interval for the routable network address of the second network device.

11. In a data-over-cable system, a method for proxying first protocol network services, the method comprising:
creating a database record comprising identification data of a second network device and identification data of a first protocol network server associated with the second network device;
intercepting at a first network device a first protocol offer message from the first protocol network server to the second network device, the first protocol offer message comprising a routable network address for the second network device and a first lease time interval associated with the routable network address;
modifying the lease time interval defined in the first protocol offer message, wherein the lease time interval is modified to a shorter lease time interval;
sending the modified first protocol offer message to the second network device;
generating a first protocol request message on the first network device using the identification data of the second network device, the first protocol request message comprising a lease renewal request for the routable network address associated with the second network device; and
sending the first protocol request message to the first protocol network server prior to an end of the lease time interval specified in the first protocol offer message;
receiving a first protocol response message from the first protocol network server, the first protocol response message defining a new lease time interval for the routable network address associated with the second network device;
intercepting the first protocol request message from the second network device, the first protocol request message defining a lease renewal request;
generating the first protocol response message on the first network device using the identification data of the first protocol network server, the first protocol response message defining a second lease time interval, wherein the second lease time interval comprises a shortened lease time interval defined in the first protocol response message received from the first protocol network server; and
sending the first protocol response message generated on the first network device to the second network device.

12. A computer readable medium having stored therein instructions for causing a central processing unit to execute the method of claim 11.

13. The method as claimed in claim 11, wherein the first network device comprises a cable modem, the second network device comprises a customer premise equipment entity and the first protocol network server comprises a Dynamic Host Configuration Protocol network server.

14. The method as claimed in claim 11, wherein the first protocol offer message comprises a Dynamic Host Configuration Protocol Offer message, and the first protocol request message comprises a Dynamic Host Configuration Protocol Request message.

15. The method as claimed in claim 11, wherein the first protocol response message from the first protocol network server comprises a Dynamic Host Configuration Protocol Offer message, the first protocol request message comprises a Dynamic Host Configuration Protocol Request message and the first protocol response message generated on the first network device comprises a Dynamic Host Configuration Protocol Offer message.

16. A system for proxying first protocol network services in a data-over-cable system, the system comprising:
a database comprising a record for a second network device in communication with a first network device, the record comprising identification data of the second network device and identification data of a first protocol network server selected by the second network device; and
the first network device intercepting first protocol messages between the second network device and the first protocol network server associated with the second network device, the first network device modifying a first protocol offer message from the first protocol network server, wherein the first network device modifies a lease time interval of a routable network address for the second network device and sends the modified first protocol offer message to the second network device,
wherein the first network device uses the identification data of the first protocol network server, the lease time interval specified in the first protocol offer message and the modified lease time interval to generate a first protocol response message for the second network device upon intercepting a first protocol lease renewal request message from the second network device, the second network device sending the first protocol lease renewal request message upon an end of the modified lease time interval.

17. The system as claimed in claim 16, wherein the first network device uses the identification data associated with the second network device to generate a first protocol lease renewal request message and sends the first protocol lease renewal message prior to an end of the lease time interval specified in the first protocol offer message.

18. The system as claimed in claim 16, wherein the first network device stores the lease time interval specified in the first protocol offer message and the modified lease time interval in the record of the second network device.

19. The system as claimed in claim 16, wherein the first network device sends the generated first protocol response message to the second network device.

20. The system as claimed in claim 16, wherein the first network device specifies a remaining lease time interval in the first protocol response message.

21. The system as claimed in claim 16, wherein the first network device comprises a cable modem, the second network device comprises a customer premise equipment entity and the first protocol network server comprises a Dynamic Host Configuration Protocol network server.

22. The system as claimed in claim 17, wherein the first protocol messages comprise Dynamic Host Configuration Protocol messages.

\* \* \* \* \*